US008603567B2

(12) United States Patent
Kageyama et al.

(10) Patent No.: US 8,603,567 B2
(45) Date of Patent: Dec. 10, 2013

(54) METHOD OF MANUFACTURING PLANT FINISHED PRODUCT

(75) Inventors: Norihiko Kageyama, Ibaraki (JP);
Koichi Nakahara, Toyonaka (JP);
Takako Inui, Ibaraki (JP); Seisuke Takaoka, Tokyo (JP); Kenzo Nagami, Osaka (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 672 days.

(21) Appl. No.: 10/530,679

(22) PCT Filed: Oct. 29, 2003

(86) PCT No.: PCT/JP03/13885
§ 371 (c)(1),
(2), (4) Date: Jul. 14, 2005

(87) PCT Pub. No.: WO2004/039936
PCT Pub. Date: May 13, 2004

(65) Prior Publication Data
US 2005/0260326 A1    Nov. 24, 2005

(30) Foreign Application Priority Data
Oct. 30, 2002    (JP) .................................. 2002-316679

(51) Int. Cl.
*A23K 1/00*    (2006.01)
(52) U.S. Cl.
USPC ........... 426/615; 426/422; 426/542; 426/597; 424/725
(58) Field of Classification Search
USPC ........................................ 426/615
See application file for complete search history.

(56) References Cited

U.S. PATENT DOCUMENTS

| | | | |
|---|---|---|---|
| 4,847,422 A | 7/1989 | Klemola et al. | |
| 5,085,883 A | 2/1992 | Garleb et al. | |
| 5,102,675 A | 4/1992 | Howell et al. | |
| 5,405,624 A | 4/1995 | Doncheck et al. | |
| 5,460,836 A | 10/1995 | Ono et al. | |
| 6,331,320 B1 | 12/2001 | Nakahara | |
| 6,449,872 B1 | 9/2002 | Olkku et al. | |
| 6,458,407 B1 | 10/2002 | Miki et al. | |
| 2002/0178781 A1 | 12/2002 | Kurokawa et al. | |

FOREIGN PATENT DOCUMENTS

| | | |
|---|---|---|
| DE | 837 684 C | 5/1952 |
| EP | 0 807 680 A2 | 11/1997 |
| EP | 0 810 163 | 12/1997 |
| FR | 2 659 980 | 9/1991 |
| JP | 49-109162 | 10/1974 |

(Continued)

OTHER PUBLICATIONS

Ando et al., "Decomposition Behavior of Plant Biomass Using Hot-Compressed-Water," Research Report of Kagoshima Prefectural Institute of Industrial Technology, Japan, No. 14, pp. 45-52, 2000 (partial English-language translation).

(Continued)

*Primary Examiner* — Vera Stulii
(74) *Attorney, Agent, or Firm* — Drinker Biddle & Reath LLP

(57) ABSTRACT

A method of manufacturing a plant finished product, comprising the step of processing a plant or a processed material thereof with high-temperature and high-pressure liquid, gas, or fluid.

15 Claims, 3 Drawing Sheets

(56) References Cited

FOREIGN PATENT DOCUMENTS

| | | |
|---|---|---|
| JP | 58-165761 | 9/1983 |
| JP | 62-040287 | 2/1987 |
| JP | 63-54351 | 10/1988 |
| JP | 03-119954 | 5/1991 |
| JP | 4036209 * | 2/1992 |
| JP | 04-327160 | 11/1992 |
| JP | 04-330267 | 11/1992 |
| JP | 7-501685 | 2/1995 |
| JP | 07-099911 | 4/1995 |
| JP | 07-147918 | 6/1995 |
| JP | 09-242825 | 9/1996 |
| JP | 08-318138 | 12/1996 |
| JP | 9-37756 | 2/1997 |
| JP | 09-220080 | 8/1997 |
| JP | 11-089722 | 4/1999 |
| JP | 11-165142 | 6/1999 |
| JP | 11-285677 | 10/1999 |
| JP | 11-292799 | 10/1999 |
| JP | 2000-2701 | 1/2000 |
| JP | 2000-4866 | 1/2000 |
| JP | 2000-33496 | 2/2000 |
| JP | 3042076 | 3/2000 |
| JP | 2000-225382 | 8/2000 |
| JP | 2001-120199 | 5/2001 |
| JP | 2001-205070 | 7/2001 |
| JP | 3255962 | 11/2001 |
| JP | 2002-51751 | 2/2002 |
| JP | 2002-059118 * | 2/2002 |
| JP | 2002-102897 | 4/2002 |
| JP | 2002-131306 | 5/2002 |
| JP | 2002-528101 | 9/2002 |
| JP | 2002-315674 | 10/2002 |
| RU | 2 187 552 C1 | 8/2002 |
| WO | WO 99/53002 | 10/1999 |
| WO | WO 9952841 * | 10/1999 |
| WO | WO 01/54837 | 8/2001 |

OTHER PUBLICATIONS

Karpunin et al, "US Prehydrolysis of Flax Straw," Research Institute of Industry of Primary Treatment of Bast Fibers, Russia, vol. 52, No. 6, pp. 1358-1363, 1979 (English-language translation).

International Search Report mailed Feb. 3, 2004, in International PCT Appln. No. PCT/JP03/13885 filed Oct. 29, 2003.

Notification of Reasons for Refusal issued Aug. 26, 2008, in Japanese patent application No. 2004-548076 (English-language translation) and English translation of examined claims in application.

Ehara et al., "Chemical conversion of wood by subcritical or supercritical water—Degradation of lignin-," Lignin Symposium, Japan, Oct. 10, 2000, vol. 45,pp. 123-126 (English Abstract).

Yadav et al., "Carbohydrate Make Up of Huskey Barley," *Starch*, Apr. 2000, vol. 52, No. 4, pp. 125-128.

Oscarsson et al., "Chemical Composition of Barley Samples Focusing on Dietary Fibre Components", *Journal of Cereal Science*, Sep. 1996, vol. 24, No. 2, pp. 161-170.

Supplemental European Search Report dated Apr. 27, 2011, in EP Application No. 03769992.3 filed Apr. 26, 2005.

Bartolomé, et al., "Phenolics and related substances in alcohol-free beers", Eur. Food Res. Technol., 2000, vol. 210, pp. 419-423.

Dimberg, et al., "Variation in Oat Groats Due to Variety, Storage and Heat Treatment 1: Phenolic Compounds", Journal of Cereal Science, 1996, vol. 24, pp. 263-272.

Emmons, et al., "Antioxidant Activity and Phenolic Contents of Oat Groats and Hulls", Cereal Chemistry, 1999, vol. 76, No. 6, pp. 902-906.

J. M. Bvochora, et al., "Changes occuring in sorghum phenolic compounds during fermentation to produce *mahewu* and opaque beer", Biochem. Soc. Transactions, 2000, vol. 28, Part 5, p. A290, 998, Abstract.

* cited by examiner

METHOD OF MANUFACTURING PLANT FINISHED PRODUCT

TECHNICAL FIELD

The present invention relates to a method of manufacturing a new plant finished product and a use of a plant finished product obtained by the said method.

BACKGROUND ART

In recent years, a demand for development of food or drink with a new aroma or taste is becoming increasingly stronger along with the diversification of the consumer's tastes. This is because it is possible to make a product different from others and to have superiority by imparting new aroma and taste to food and drink. However, in a case where an existing raw material is processed according to a conventional method, an obtainable flavor is nothing more than an extension of a conventional flavor even when the conditions of processing are changed. Thus, it is generally difficult to create an absolutely new flavor. Therefore, in order to impart an absolutely new flavor to food or drink, it is necessary to develop (1) a method for processing an existing raw material in a new manner, (2) a method for processing a new raw material in a conventional manner, and (3) a method for processing a new raw material in a new manner.

The decision of which methods among the above mentioned methods to use is made depending on the properties of food or drink to be manufactured. For example, since raw materials of beer are limited to malt, hops, rice, etc. in the Liquor Tax Law, the development of new raw materials for beer has limitations. Therefore, it is necessary to develop a technique for imparting a new flavor to beer by processing an existing raw material in a new manner.

On the other hand, in a case of happoushu or other drinks like beer ("happoushu" in the below descriptions), so long as it is manufactured using malt as a raw material and is effervescent, raw materials other than malt and manufacturing methods are not limited. Therefore, it is relatively easy to increase the variety of flavors of happoushu by the use of new raw materials. For example, in order to impart a new flavor to happoushu such as a beer-like beverage, an absolutely new raw material obtained by adding an additional other material to an existing raw material such as malt can be used (see, for example, Claim 1 etc. of Japanese Patent Laid-open No. Hei 9-37756). However, it is not easy to obtain an absolutely new flavor as long as an existing raw material such as malt used now. Therefore, it is also necessary to develop a technique for imparting an absolutely new flavor to happoushu or the like by processing an existing raw material in a new manner.

Heretofore, various methods for processing existing raw materials such as malt have been developed. For example, in a case of beer manufacture, the specialty malt such as melanoidin malt or caramel malt is used as one of raw materials in order to control the color or flavor of beer products. Such specialty malt is manufactured by roasting malt at a higher temperature than usual in a process of malt manufacture to allow caramelization or the Maillard reaction to occur. Specifically, malt is normally roasted for about 2 to 6 hours at about 80° C. to stop germination. On the other hand, melanoidin malt is manufactured by roasting malt for about 2 to 6 hours at about 100 to 130° C. in open air, and caramel malt is manufactured by roasting malt for about 2 to 6 hours at about 130 to 160° C. in open air.

However, such a specialty malt manufacturing method involves a problem that input energy is large due to high temperature roasting. From the viewpoint of reduction in the input energy, technical developments to reduce the time for roasting is desired.

Further, the specialty malt manufacturing method also involves a problem in that substances contained in malt are oxidized, because malt is roasted in an open system where oxygen is continuously supplied. The such oxides produced have adverse effects on the quality of beer or happoushu. Among such oxides, lipid peroxides and aldehydes produced due to the oxidation of lipids contained in the malt deteriorate beer or happoushu in flavor. For example, an oxidized smell is given and a bad aftertaste is left on the tongue. In addition, such lipid peroxides and aldehydes also reduce head retention and impair flavor stability. For this reason, it is desired to develop a technique for suppressing the oxidation of lipids contained in raw materials when the raw materials such as malt are processed.

Under these circumstances, various methods for minimizing the oxidation of substances in the process of manufacturing alcoholic drink using malt or the like as a raw material are being actively investigated, and some methods have already been disclosed (see Japanese Patent Laid-open No. JP-A-2000-4866, No. 2000-2701, and No. 2002-131306). Further, a technique for removing lipids from raw materials by the use of supercritical $CO_2$ has also been developed (see Japanese Patent No. 3255962). However, a technique for suppressing the oxidation of lipids contained malt to be used as a raw material in a process of manufacturing the malt has not yet been developed.

DISCLOSURE OF THE INVENTION

It is therefore an object of the present invention to provide a method of manufacturing a plant finished product having a new flavor, and a method of manufacturing food or drink by the use of the plant finished product as a raw material. It is another object of the present invention to provide a method of manufacturing a plant finished product, by which the oxidation of substances in a plant can be suppressed in process of manufacturing of the plant finished product mentioned above. It is still another object of the present invention to provide a method of manufacturing a plant finished product, by which processing time and input energy can be reduced.

In order to achieve the above objects, the present inventors have intensively studied. As a result, they have found that by processing a plant with high-temperature and high-pressure liquid or gas under low-oxygen conditions, it is possible to decompose lignin in the plant and increase low-molecular phenol compounds (constituents of lignin) such as vanillin, p-coumaric acid (para-coumaric acid), or ferulic acid, thereby enabling the plant to have a new flavor. In addition, they have also found that the Maillard reaction occurs among components contained in the plant and organic acids are increased due to such processing. The products of the Maillard reaction and organic acids produced through the processing described above and the changes of other components in the plant due to the processing described above make it possible to provide a plant finished product having a new aroma, taste, and color, and food or drink manufactured using such plant finished product as a raw material.

Further, the present inventors have also found that the processing described above can reduce the deterioration of lipids or polyphenols in a plant caused by oxidation. As the result, the above processing provides a new plant finished product wherein the production of oxides such as lipid peroxides is suppressed, and food or drink manufactured using such plant finished product as a raw material.

A method for manufacturing an aromatic compound such as vanillin by processing a plant with supercritical water or subcritical water has already been disclosed (see Claim 1 and line 45 in a right column of page 1 of Japanese Patent Laid-open No. Hei 11-292799). However, processing with supercritical water or sub-critical water under low-oxygen conditions is not described at all. Further, countermeasures against the deterioration of lipids contained in a plant due to the oxidation have not been taken at all and such countermeasures have not been suggested at all.

As a technique for processing a plant or the like under the lower temperature and pressure conditions as compared to a case where supercritical water or subcritical water is used, a technique of subjecting seeds to high-temperature and high-pressure extraction using desalted- or low salt-deep ocean water has been disclosed (see Claim 8 of Japanese Patent Laid-open No. 2002-51751). The Japanese Patent Laid-open No. 2002-51751 is directed to provide transparent mineral water having no color, aroma, and taste, and therefore it does not describe or suggest a technique for decomposing lignin to impart a new flavor. In addition, there is problems that no countermeasures directed toward the prevention of the oxidation of components in the plant are taken, and processing time is too long (i.e., 40 minutes).

Therefore, the present invention is directed to (1) a method of manufacturing a plant finished product, comprising the step of processing a plant or a processed material thereof with high-temperature and high-pressure liquid, gas, or fluid under conditions where an oxygen concentration is 0 to 1 μg/mL, (2) the method of manufacturing a plant finished product according to (1) described above, wherein the plant or the processed material thereof is processed for 1 to 3,600 seconds with liquid, gas, or fluid having a temperature of 140 to 500° C. and a pressure of 0.1 to 100 MPa, under conditions where an oxygen concentration is 0 to 1 μg/mL, (3) the method of manufacturing a plant finished product according to (1) described above, wherein the plant or the processed material thereof is processed for 10 to 1,200 seconds with liquid, gas, or fluid having a temperature of 160 to 250° C. and a pressure of 0.5 to 4.5 MPa, under conditions where an oxygen concentration is 0 to 1 μg/mL, (4) the method of manufacturing a plant finished product according to any one of (1) to (3) described above, wherein the liquid, gas, fluid is derived from deaerated liquid, (5) the method of manufacturing a plant finished product according to any one of (1) to (4) described above, wherein gas having an oxygen concentration of 0 to 1 μg/mL is used to purge a processing container before processing, (6) the method of manufacturing a plant finished product according to (5) described above, wherein the gas having an oxygen concentration of 0 to 1 μg/mL is an inert gas, carbon dioxide, or deoxidized gas, (7) the method of manufacturing a plant finished product according to any one of (1) to (6) described above, wherein the plant or the processed material thereof is a plant containing lignin or a processed material thereof, and (8) the method of manufacturing a plant finished product according to (7) described above, wherein the lignin-containing plant or the processed material thereof is at least one or more selected from grains, trees, teas, processed materials thereof, and a by-product of mashing.

Further, another aspect of the present invention is directed to (9) a plant finished product manufactured by the method according to any one of (1) to (8) described above, which contains 0.15 mg/100 g or more of vanillin,

(10) the plant finished product according to (9) described above, which is derived from grains, trees, teas, or processed materials thereof,

(11) the plant finished product according to (10) described above, which is derived from malt or malt husk,

(12) food or drink manufactured using the plant finished product according to any one of (9) to (11) described above as a raw material,

(13) the food or drink according to (12) described above, which is drink selected from liquors and soft drinks or foods selected from confectionery and rice foods,

(14) food or drink manufactured using the plant finished product according to any one of (9) to (11) described above as a raw material,

(15) the food or drink according to (14) described above, which is liquor,

(16) the food or drink according to (12) described above, wherein the plant finished product according to any one of (9) to (11) described above is used as a raw material in an amount of more than 0% but 100% or less of all the raw materials used other than water,

(17) the food or drink according to (16) described above, wherein the usage ratio of the plant finished product according to any one of (9) to (11) described above is 0.1 to 50% by weight relative to all the raw materials used other than water,

(18) the food or drink according to (16) described above, wherein the usage ratio of the plant finished product according to any one of claims 9 to 11 is 0.3 to 30% by weight relative to all the raw materials used other than water,

(19) the food or drink according to any one of (12) to (18) described above, which contains 0.005 μg/mL or more of vanillin, and

(20) beer manufactured using the plant finished product according to any one of (9) to (11) described above as at least one of raw materials.

Here, the word "beer" means beer defined in the Liquor Tax Law and beer-like beverages including happoushu.

Furthermore, still another aspect of the present invention is directed to

(21) a method of manufacturing a composition containing vanillin, comprising the step of processing a plant containing lignin or a processed material thereof with high-temperature and high-pressure liquid, gas, or fluid to increase the amount of vanillin contained therein,

(22) the method of manufacturing a composition containing vanillin according to (21) described above, wherein the temperature of the liquid, gas, or fluid is 140° C. to 500° C. and the pressure of the liquid, gas, or fluid is 0.1 to 100 MPa,

(23) the method of manufacturing a composition containing vanillin according to (21) or (22) described above, wherein the high-temperature and high-pressure processing is carried out for 1 to 3,600 seconds,

(24) the method of manufacturing a composition containing vanillin according to any one of (21) to (23) described above, wherein the composition containing vanillin is a raw material of food and drink,

(25) the method of manufacturing a composition containing vanillin according to any one of (21) to (24) described above, wherein the composition containing vanillin is a raw material of liquors or tea drinks,

(26) the method of manufacturing a composition containing vanillin according to any one of (21) to (25) described above, wherein the plant containing lignin or the processed material thereof is derived from grain,

(27) the method of manufacturing a composition containing vanillin according to (26) described above, wherein the grain is malt,

(28) the method of manufacturing a composition containing vanillin according to any one of (21) to (27) described above, wherein the vanillin content of the composition containing vanillin is three times or more as compared to that of the plant containing lignin or the processed material thereof before high-temperature and high-pressure processing,

(29) the method of manufacturing a composition containing vanillin according to any one of (21) to (28) described above, further comprising a step of exposing a product obtained through high-temperature and high-pressure processing to a low pressure from a high pressure to transpire moisture and puff out the product,

(30) the method of manufacturing a composition containing vanillin according to any one of (21) to (29) described above, wherein an extruder is used,

(31) the method of manufacturing a composition containing vanillin according to (29) or (30) described above, wherein the composition containing vanillin is puffed out into a stick-like shape, a cylindrical column shape, a polygonal prism shape, a spherical shape, or a polyhedron shape,

(32) the method of manufacturing a composition containing vanillin according to any one of (21) to (31) described above, wherein the plant, the processed material thereof, or the raw material containing the plant and/or the processed material thereof is processed under conditions where an oxygen concentration is 0 to 1 µg/mL,

(33) a composition containing vanillin, which is manufactured by the method according to any one of (21) to (32) described above,

(34) a composition containing malt, which is manufactured by the method according to any one of (21) to (32) described above,

(35) food or drink which is manufactured using, as a raw material, the composition containing vanillin manufactured by the method according to any one of (21) to (32) described above,

(36) the food or drink according to (35) described above, which is any one of beer, happoushu, whiskey, shochu (Japanese white liquor), and fruit wine,

(37) the food or drink according to (35) described above, which contains 0.005 µg/mL or more of vanillin, and

(38) the food or drink according to (37) described above, which is any one of beer, happoushu, whiskey, shochu (Japanese white liquor), and fruit wine.

According to the present invention, it is possible to hydrolyze and thermally decompose lignins that are low-water soluble compounds contained in a plant, thereby enabling a plant finished product containing low-molecular lignin-derived phenol compounds (that are constituents of lignin) to be obtained. Therefore, it is possible to provide a plant finished product having a nonconventional robust aroma and a rich taste.

According to the present invention, it is also possible to minimize the contact between the components of a plant and oxygen because the plant is processed with high-temperature and high-pressure liquid or gas in a hermetically-sealed system to maintain low-oxygen conditions. As a result, the oxidation of substances contained in the plant, especially lipids and aldehydes are suppressed. This makes it possible to provide a plant finished product whose oxidized aroma and unpleasant aftertaste on the tongue are reduced.

Further, according to the present invention, it is also possible to reduce processing time and input energy, because a plant is processed using high-temperature and high-pressure liquid or gas.

In addition, when a plant is processed with high-temperature and high-pressure liquid or gas, the Maillard reaction occurs among components of the plant to change its color into brown, thereby enabling a plant finished product to have a brown color.

Grain husks are usually disposed as wastes. However, according to the present invention, it is possible to effectively utilize or recycle grain husks.

BEST MODE FOR CARRYING OUT THE INVENTION

Figure 1:
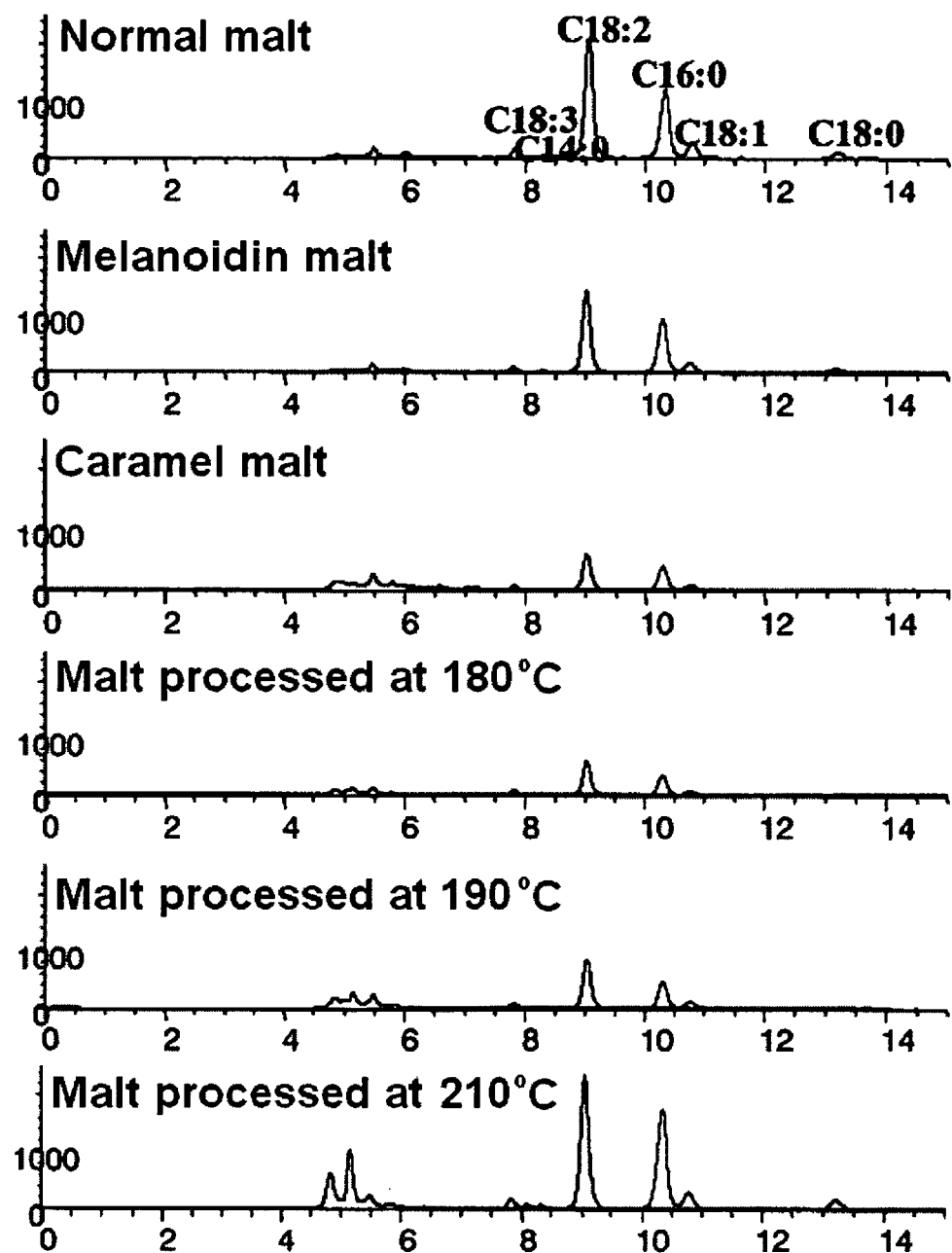
FIG. 1 shows the result of analyzing the long-chain fatty acid contained in European two-rowed barley malt, malt finished products obtained by subjecting the European two-rowed barley malt to high-temperature and high-pressure processing, and specialty malts.

A plant to be used in the present invention is not particularly limited, but a plant containing a lignin is preferable. Here, lignin is a product obtained by the dehydrogenative polymerization of p-hydroxycinnamyl alcohols with an enzyme and having a certain amount of methoxy groups (Junzo Nakano, "Chemistry of Lignins, revised edit. Uni Shuppan K.K., 1990, p. 15). Typical examples of such a plant containing lignin include vascular plants such as seed plants and ferns. Still, other plant species can also be used as long as they contain lignin. Specific examples of such plants include, but are not limited to: grains such as barley, wheat, rye, wild oat (*Avena sativa*), oat, rice, corn, Japanese barnyard millet, foxtail millet, millet (*Panicum miliaceum*), buckwheat, and Job's tear; trees such as oak, cherry, Amur corktree (*Phellodendron amurense*), maple, horse chestnut, Japanese chestnut, Japanese pagoda tree, Japanese zelkova, Japanese cypress, Japanese cedar, Japanese umbrella pine, bamboo, Japanese oak (*Quercus* cuspidata), pine, Hiba (*Thujopsis dolabrata*), bamboo grass, paulownia (*Paulownia tomentosa*), Ume Japanese apricot), peach, wisteria, fir, elm, maidenhair tree, camellia, willow, mulberry, teak, mahogany, magnolia, Japanese persimmon, apricot, Chinese quince, rosemary, rose, Japanese medlar, Japanese quince, fragrant olive, camphor tree, yew tree, acacia, and Ukogi; teas; and beans such as soybean, red bean, pea, broad bean, and kidney bean. Examples of a composition containing lignin include the above-mentioned plants and mixtures of two or more of them. A vanillin-containing composition means a composition becoming to include vanillins in inside thereof by subjecting it to high-temperature and high-pressure processing according to the present invention.

In the present invention, the above-mentioned "plant" means not only a full plant body but also plant tissue or a processed material of a plant body or plant tissue. Namely, in the present invention, not only a plant per se but also a processed material thereof can be used. Plant tissue to be used is not particularly limited as long as it is a part of a plant body. Examples of such plant tissue include germinated seeds, pre-emergence seeds, seed coats, buds, flowers, stems, leaves, and roots. A processed material to be used is not particularly limited as long as it is obtained by subjecting a plant body or plant tissue to some kind of processing. Examples of such processed materials include pulverized materials, crushed materials, triturated materials, dried materials, freeze-dried materials, extracts (including extracts obtained by supercritical extraction), concentrates thereof, and residual solid matters after extraction. More specifically, chopped or powdered materials derived from grain husks, malt, and trees and a by-product of mashing can be preferably used as plants in the present invention.

Also included in the above-mentioned plants to be used in the present invention are fungi.

In the present invention, the above-mentioned plant or processed material thereof is processed with high-temperature and high-pressure liquid, gas, or fluid. Hereinafter, such processing is also referred to as "high-temperature and high-pressure processing".

Examples of a liquid to be used for such processing include water, alcohol, beer, happoushu, whiskey, vodka, gin, rum, mao-tai, whiskey malt, shochu (Japanese white liquor), wine, brandy, juice, tea, and malt beverage. These liquids can be used singly or in combination of two or more of them. Further, they may be subjected to preprocessing. Examples of the preprocessing include deaeration and previous addition of additives. As for deaeration, there are exemplified deoxidation and decompression. Examples of such additives include antioxidants (e.g. vitamin C, etc.), substances having the effect of catalyzing lignin decomposition (e.g. zirconium oxide, etc.), acid materials (e.g. lactic acid, acetic acid, etc.), and basic materials (e.g. sodium carbonate, sodium bicarbonate, etc.). With respect to the preprocessing, concentration or dilution of the above-mentioned liquid or change of pH of the above-mentioned liquid may also be carried out.

Examples of a gas to be used for high-temperature and high-pressure processing include vapors of the above-mentioned liquids. Specifically, water vapor, alcoholic vapor, and vapors of beer, whiskey, and tea can be mentioned. These vapors can be used singly or in combination of two or more of them.

Examples of a fluid to be used for high-temperature and high-pressure processing include fluids derived from the above-mentioned liquids, such as supercritical fluids and sub-critical fluids. When the temperature and pressure of a liquid exceed certain values (i.e., a critical point), respectively, the interface between gas and liquid is lost and they exist together to keep a fluid state in some ranges. Such a fluid is referred to as a supercritical fluid. A supercritical fluid is a high-density fluid, and has properties between gas and liquid. A sub-critical fluid is a fluid whose temperature and pressure are below a critical point.

In high-temperature and high-pressure processing, the temperature of liquid, gas, or fluid is preferably in the range of about 140 to 500° C. By setting the temperature of liquid, gas, or fluid to about 140° C. or higher, decomposition of lignin is sufficiently accelerated. However, from the viewpoint of safety, reduction in input energy, and capital investment, the temperature of liquid, gas, or fluid is preferably about 500° C. or less. Further, the temperature of liquid, gas, or fluid is more preferably in a range where excessive oxidation does not occur and a burnt odor resulting from oxidation does not become too strong. Therefore, the temperature of liquid, gas, or fluid is more preferably in the range of about 160 to 250° C. By setting the temperature of liquid, gas, or fluid to a value within the above range, lignin decomposition occurs more effectively, reduction in the amount of assimilable sugar is small, reaction can be easily controlled, and a finished product with little burnt smell can be obtained. Particularly preferably, the temperature of liquid, gas, or fluid is in the range of about 180 to 250° C. By setting the temperature of liquid, gas, or fluid to a value within the above range, lignin decomposition is further accelerated and therefore aromatic components are increased, so that a finished product can have a good aroma. When the temperature of liquid, gas, or fluid is about 250° C. or less, oxidation of lipid is suppressed and therefore an oxidized smell of a plant finished product is reduced. As described above, by setting the temperature of liquid, gas, or fluid to a value within the range of about 140 to 500° C., it is possible to obtain the effect of the present invention. However, by setting the temperature of liquid, gas, or fluid closer to the value within the most preferable range, that is, within the range of about 180 to 250° C., it is possible to obtain a more enhanced effect of the present invention. Namely, as long as the temperature of liquid, gas, or fluid is in the range of about 140 to 500° C., it is possible to obtain the effect of the present invention according to the value of the temperature.

In high-temperature and high-pressure processing, the pressure of liquid, gas, or fluid is preferably in the range of about 0.1 to 100 MPa. In this specification, the word "pressure" means "gauge pressure". For example, when "pressure of 0.1 MPa" is expressed in terms of absolute pressure, atmospheric pressure is added to 0.1 MPa. By setting the pressure of liquid, gas, or fluid to a value within the above range, it is possible to effectively decompose lignin contained in a plant. More preferably, the pressure of liquid, gas, or fluid is in the range of about 0.25 to 4.5 MPa. As described above, by setting the pressure of liquid, gas, or fluid to a value within the range of about 0.1 to 100 MPa, it is possible to obtain the effect of the present invention. However, by setting the pressure of liquid, gas, or fluid closer to the value within the most preferable range, that is, within the range of about 0.25 to 4.5 MPa, it is possible to obtain a more enhanced effect of the present invention. Namely, as long as the pressure of liquid, gas, or fluid is in the range of about 0.1 to 100 MPa, it is possible to obtain the effect of the present invention according to the value of the pressure.

Further, it is preferred that high-temperature and high-pressure processing is carried out at an oxygen concentration of about 0 to 1 µg/mL. In the present invention, such low-oxygen conditions can be created by a known method. For example, by deaerating (that is, by removing air from) a liquid to be used for high-temperature and high-pressure processing, it is possible to create such low-oxygen conditions. Alternatively, a substance capable of eliminating oxygen may be previously added to a liquid to be used for high-temperature and high-pressure processing instead of using a deaerated liquid. Further, by purging the inside of a processing container with gas having an oxygen concentration of about 0 to 1 µg/mL before high-temperature and high-pressure processing, it is also possible to create such low-oxygen conditions. Here, gas having an oxygen concentration of about 0 to 1 µg/mL is not particularly limited, but is preferably an inert gas such as nitrogen, carbon dioxide, or deoxidized gas. As deoxidized gas, gas obtained by bringing a deaerated liquid to a boil can be mentioned by way of example. The oxygen concentration during processing can be measured by a known method. For example, the oxygen concentration can be measured using a dissolved oxygen meter (DO meter) usually used.

By carrying out high-temperature and high-pressure processing in low-oxygen conditions, it is possible to suppress the deterioration due to oxidation of substances contained in a plant, especially lipids or polyphenols likely to be oxidized.

In addition, it is also possible to suppress the corrosion or deterioration of a processing container such as a boiler or the like.

The processing time is preferably in the range of about 1 to 3,600 seconds, more preferably in the range of about 10 to 1,200 seconds. By setting the processing time to a value within the above range, it is possible to allow the reaction to occur more stably and reliably and obtain a plant finished product with little influence of oxidation. Even more preferably, the processing time is in the range of about 10 to 600 seconds. By setting the processing time to a value within the above range, it is also possible to reduce input energy. Particularly preferably, the processing time is in the range of about 10 to 300 seconds. By setting the processing time to a value within the above range, it is also possible to improve a capacity of utilization as well as to further reduce input energy. As described above, by setting the processing time to a value within the range of about 1 to 3,600 seconds, it is possible to obtain the effect of the present invention. However, by setting the processing time closer to a value within the most preferable range, that is, within the range of about 10 to 300 seconds, it is possible to obtain a more enhanced effect of the present invention. Namely, as long as the processing time is in the range of about 1 to 3,600 seconds, it is possible to obtain the effect of the present invention according to the processing time.

An apparatus to be used for high-temperature and high-pressure processing is not particularly limited as long as it has a structure capable of withstanding high temperatures and pressures. As such an apparatus, an apparatus using a pressure-resistant reactor and a heating device together can be mentioned by way of example. In such an apparatus, liquid or gas is heated by the heating device to generate liquid or gas having high temperature and pressure, and such liquid or gas is fed to the reactor. A heating device to be used is not particularly limited as long as it can heat liquid or gas. For example, heating may be carried out using, but not limited to, electric power, oil, coal, gas, solar energy, or geothermal energy. Alternatively, an apparatus to be used may be simply a pipe or the like resistant to heat and pressure. The raw material of the reactor or the pipe is not particularly limited as long as it is resistant to heat and pressure, but one causing the elution of a component such as metal, the production of toxic substances, and the emission of an unpleasant smell is not preferable. For this reason, the raw material of the reactor or the pipe is preferably, but not limited to, stainless steel to prevent undesired reaction, corrosion, and deterioration.

In the present invention, known processing may be further carried out after high-temperature and high-pressure processing. Examples of the known processing include, but are not limited to, pulverization, extraction (including supercritical extraction), and drying.

After high-temperature and high-pressure processing with liquid, gas, or fluid, a drying step may be further carried out. When a plant finished product obtained through high-temperature and high-pressure processing is left standing as it is, starch solidifies so that the plant finished product becomes stiff when cooled. As a result, the subsequent pulverizing step requires great power. For this reason, in order to obtain a plant finished product easier to handle, a drying step is preferably employed, thereby enabling the subsequent pulverizing step to be easily carried out. As a drying method, a method in which pressure is rapidly decreased after high-temperature and high-pressure processing to transpire moisture in a short period of time, that is, to rapidly dry a plant finished product can be mentioned by way of example. According to such a method, it is possible to solve the problem, a plant finished product becomes stiff after high-temperature and high-pressure processing, because a rapid decrease in pressure makes it possible for the plant finished product to have a sponge-like structure. Such a drying step also makes it easy to carry out the subsequent dissolving or pulverizing step. As described above, by actively drying a plant finished product after the completion of high-temperature and high-pressure processing with liquid, gas, or fluid, the plant finished product can be more easily handled in the subsequent step as compared to a case where a plant finished product is naturally dried after the completion of high-temperature and high-pressure processing with liquid, gas, or fluid.

Further, in such a drying step, a plant finished product obtained through high-temperature and high-pressure processing with liquid, gas, or fluid may be formed into a desired shape such as a stick-like shape, a cylindrical column shape, a spherical shape, a polygonal prism shape, or a polyhedral shape, by using an extrusion means or a pulling out means and, when necessary, a cutting means together. At this time, the water content of the plant finished product may be controlled.

At the time of high-temperature and high-pressure processing or before high-temperature and high-pressure processing, a pulverizing step may also be added. By carrying out a pulverizing step, the processing can be uniformly carried out, raw materials can be uniformly mixed, and a plant finished product according to the present invention can be made uniform. In addition, such a plant finished product according to the present invention can be more easily formed into a desired shape. In addition to such a pulverizing step, a mixing step may also be added. By carrying out a mixing step, it is possible to uniformly mix pulverized raw materials.

The above drying step may be carried out in a vacuum or under reduced pressure, or in an atmosphere of an inert gas to prevent the oxidation of a plant finished product. This makes it possible to prevent the oxidation of lipids. An inert gas to be used is not particularly limited as long as it can prevent the oxidation. Examples of such an inert gas include, but are not limited to, nitrogen, argon, carbon dioxide, and hydrogen.

In the present invention, it is not always necessary to create low-oxygen conditions when high-temperature and high-pressure processing is carried out. Even in a case where an oxygen concentration is not set to low, it is possible to sufficiently obtain the effect of the present invention. Therefore, it is not particularly necessary to use deaerated water.

As an apparatus for effectively carrying out the present invention, an extruder can be mentioned. The use of an extruder makes operations very easy to be carried out after high-temperature and high-pressure processing. In addition, since an extruder allows continuous processing, it is possible to supply a large amount of finished product. For this reason, an extruder is suitable for the present invention. Such an extruder is often used in manufacturing puffed foods. Examples of an extruder include a multi-screw extruder such as a twin-screw extruder and a single-screw extruder. In such an extruder, a raw material is heated and pressurized while being mixed by a screw provided in an extrusion cylinder and is then extruded through a die in high temperature and pressure conditions. In the present invention, a twin-screw extruder is preferably used to carry out high-temperature and high-pressure processing stably. In the present invention, the processing using such an extruder is preferably carried out at a pressure of about 0.1 to 100 MPa and a temperature of about 140 to 250° C., more preferably at a pressure of about 0.5 to 4.5 MPa and a temperature of about 160 to 250° C., for about 10 to 1,200 seconds. By carrying out the processing under the above conditions, it is possible to effectively decompose lignin, increase vanillin content, and obtain a little-burned plant finished product. As described above, the use of an extruder makes it possible to carry out the processing continuously. Further, by changing the pressure of a processing atmosphere rapidly from high to low after the processing, it is possible to transpire moisture. Furthermore, by appropriately selecting the shape of a die, it is possible to form a plant finished product into a desired shape. In this case, since the plant finished product is puffed out, the plant finished product is easily dissolved in liquid such as water. In a case where high-temperature and high-pressure processing is carried out using an extruder, it is not always necessary to control an oxygen concentration. That is, high-temperature and high-pressure processing can be carried out normal operational method of an extruder without using deaerated water.

As an apparatus suitable for carrying out the present invention other than an extruder, an apparatus for use in manufacturing puffed rice (rice snack) can also be mentioned. By using an apparatus for such puffed rice, it is possible to rapidly change pressure from high to low after batch processing. In a case where such an apparatus for puffed rice is used for carrying out the present invention, the apparatus is preferably made from a material resistant to high temperatures and pressures, such as SUS, etc. An apparatus to be used in the present invention is not limited to the apparatuses described above, and other apparatuses can also be used as long as they can satisfy the conditions described above. Further, it is to be expected that a novel apparatus will be developed.

Until now, practical conditions where lignin can be effectively decomposed have not yet been developed. The present invention solves the problem. The effect of the present invention can be basically obtained by decomposing lignin. The present invention has opened the way to decompose lignin effectively for the first time and to use a product of decomposition of lignin as a raw material for manufacturing various foods and drinks. This makes it possible to manufacture beer or happoushu having absolutely new taste and aroma.

A plant finished product obtained through the above-described high-temperature and high-pressure processing contains a lignin-derived phenol compound in a larger amount as compared to before the processing. The word "lignin-derived phenol compound" is a generic term for phenol compounds constituting lignin. The lignin-derived phenol compounds include phenol compounds that are produced through, for example, the decomposition of lignin. Examples of a low molecular lignin-derived phenol compound include p-hydroxyphenyl compounds such as p-coumaric acid, guaiacyl compounds such as vanillin and ferulic acid, syringyl compounds such as syringic acid and syringaldehyde, and oligomers thereof.

By increasing the amount of the lignin-derived phenol compounds contained in a plant finished product, it is possible to impart a robust aroma, richness, and a savory taste resulting from the lignin-derived phenol compounds to the plant finished product. In addition, the Maillard reaction occurs due to high-temperature and high-pressure processing so that a plant finished product turns brown. Therefore, for example, a malt finished product of the present invention can be used as a substitute for specialty malt such as melanoidin malt or caramel malt conventionally used.

A plant finished product obtained through the above-described high-temperature and high-pressure processing preferably contains about 0.05 mg/100 g or more of vanillin, particularly about 0.15 mg/100 g or more. The amount of vanillin contained in a plant finished product can be measured by a method described in Example 1. Since the amount of vanillin contained in a natural plant is very small, the amount of vanillin contained in a plant finish product can be used as an evaluation index of high-temperature and high-pressure processing according to the present invention. That is, by measuring the amount of vanillin contained in a plant finished product, it is possible to determine the decomposition efficiency of lignin in high-temperature and high-pressure processing. The measurement result can also be applied to quality control of the products.

Particularly, a finished product of grain or a processed material thereof preferably contains about 0.15 mg/100 g or more of vanillin. When grain such as malt, pre-emergence barley seeds, or rice seeds or a processed material thereof is subjected to high-temperature and high-pressure processing, lignin is decomposed to produce large amounts of vanillin (that is hardly detected in a natural plant) and lignin-derived phenol compounds (that are contained in a natural plant only in a small amount) such as p-coumaric acid and ferulic acid. More specifically, in a case where malt is processed using liquid, gas, or fluid under high temperature and pressure conditions to obtain a malt finished product, the malt finished product preferably contains about 0.05 to 150 mg of vanillin/100 g of malt, more preferably 0.1 to 150 mg of vanillin/100 g of malt, even more preferably 0.15 to 150 mg of vanillin/100 g of malt. In a case where malt husks are processed using liquid, gas, or fluid under high temperature and pressure conditions to obtain a malt husk finished product, the malt husk finished product preferably contains about 0.15 to 150 mg of vanillin/100 g of malt husks, more preferably about 0.3 to 100 mg of vanillin/100 g of malt husks, even more preferably about 0.3 to 75 mg of vanillin/100 g of malt husks.

The feature of the plant finished product of the present invention is that the content of oxides is lower than that of a conventional plant finished product. Since it is difficult to directly measure the amount of generated oxides contained in a plant finished product, fatty acid having a conjugated diene as lipid oxides, aldehydes, and free fatty acids are analyzed to evaluate a plant finished product. As a preferred example of a plant finished product, one having a substantially lower absorbance at 234 nm as compared to that of a conventional plant finished product can be mentioned. The lower absorbance at 234 nm of a plant finished product means the lower degree of oxidation of unsaturated fatty acid because a conjugated diene as the oxide of unsaturated fatty acid strongly absorbs 234 nm light. Further, as a preferred example of a plant finished product, there can also be mentioned one containing aldehydes, produced as a result of breakage of a conjugated diene in conjugated diene-type fatty acids, in a substantially smaller amount as compared to that of a conventional plant finished product. Aldehydes are representatives of fatty acid oxides, and the amount thereof can be easily measured. Furthermore, since free fatty acids are produced due to the oxidation, free long-chain fatty acids are measured by a known method, specifically by a method described in the following Examples. As a preferred example of a plant finished product, one containing free fatty acid in a substantially smaller amount as compared to that of a conventional plant finished product can also be mentioned.

The plant finished product of the present invention can be used for various purposes. For example, the plant finished product of the present invention can be added to food or drink. The plant finished product of the present invention per se can be suitably used as food or drink. In this case, the plant finished product is preferably liquid represented by drink that can be consumed by animals or one obtained by subjecting a plant to high-temperature and high-pressure processing using the vapor of the liquid. Examples of such drink include alcoholic drinks and soft drinks such as juice, coffee, tea, and malt beverage. Examples of such food include confectionery, bread and buns, flour, noodles, rice foods, agricultural processed foods, forest processed foods, livestock processed foods, fishery processed foods, milk, milk product, oil and fat, oil and fat processed foods, seasoning, and other raw materials of foods.

Food containing the plant finished product of the present invention can be manufactured according to a normal manufacturing method of the food by the use of a raw material containing the plant finished product of the present invention. The plant finished product of the present invention may be added in the course of manufacturing or to a final product. The amount of the plant finished product of the present invention to be added is not particularly limited as long as it is more than 0% by weight. The amount of the plant finished product to be added may be 100% by weight, but is preferably in the range of about 0.1 to 50% by weight, more preferably in the range of about 0.1 to 30% by weight. Further, the usage ratio of the plant finished product of the present invention with respect to all the raw materials other than water is not particularly limited as long as it is more than 0% by weight. The usage ratio of the plant finished product of the present invention with respect to all the raw materials other than water may be 100% by weight, but is preferably in the range of about 0.1 to 50% by weight, more preferably in the range of about 0.5 to 30% by weight. By adding the plant finished product of the present invention in such a manner, it is possible to impart a robust aroma and richness to the food. As preferred examples of such food, confectionery and rice foods can be mentioned. Examples of confectionery include puffed rice (rice snack), cookies, biscuits, rice crackers, arare (pellet-shaped rice crackers), okaki (glutinous rice crackers), candies, gums, and snack foods. Examples of rice foods include cooked white rice, cooked brown rice, rice-like food with husk, fried rice, takikomigohan (seasoned steamed rice with vegetables and meat), and mugimeshi (rice cooked with barley).

Liquor containing the plant finished product of the present invention can be manufactured according to a normal manufacturing method of the liquor by the use of a raw material containing the plant finished product of the present invention. Here, liquor means drink with an alcohol content of 1% or more. Examples of such liquor include sake, sake compound, shochu (Japanese white liquor), mirin (Japanese shochu-based mixed liquor), beer, happoushu, fruit wines, whiskeys, spirits, liqueurs, and miscellaneous liquors defined in the Liquor Tax Law.

The amount of the plant finished product of the present invention to be added to a raw material(s) of liquor may be more than 0% by weight but 100% by weight or less with respect to the total amount of a plant-derived raw material(s) used. However, it is preferably in the range of about 0.1 to 40% by weight, particularly preferably in the range of about 0.5 to 10% by weight. By setting the amount of the plant finished product to be added to a value within the above range, it is possible to moderately impart a good flavor to the liquor. Here, the word "plant-derived raw material" means a raw material of liquor derived from a plant. Examples of such a plant-derived raw material include grains such as barley, rice, and corn.

The timing of addition of the plant finished product of the present invention to a raw material of liquor is not particularly limited. In the case of manufacturing beer, the plant finished product is preferably added in the course of mashing (the process of saccharification) or before mashing. In the case of manufacturing whiskeys, the plant finished product is preferably added in the course of mashing before distillation or before mashing. In the case of manufacturing shochu (Japanese white liquor), the plant finished product is preferably added at the time of producing molasses before fermentation. In the case of manufacturing spirits, the plant finished product is preferably added at the time of producing molasses before fermentation, before distillation, during immersion in alcohol, or at the time of blending to obtain a final product. In the case of manufacturing liqueurs, the plant finished product is preferably added during immersion in alcohol or at the time of blending to obtain a final product. A plant finished product of the present invention obtained by processing a plant with high temperature and high pressure alcohol or gaseous alcohol can also be used as liqueur.

Since liquor according to the present invention is manufactured using the plant finished product of the present invention as a raw material, it has a robust flavor and richness resulting from lignin-derived phenol compounds. The liquor according to the present invention preferably contains vanillin in an amount of about 0.005 µg/mL or more. Particularly, in the case of happoushu, it preferably contains about 0.005 to 5 µg/mL of vanillin, more preferably about 0.005 to 1 µg/mL, even more preferably about 0.005 to 0.1 µg/mL. In the case of beer, it preferably contains about 0.005 to 20 µg/mL of vanillin, more preferably about 0.005 to 5 µg/mL, even more preferably about 0.005 to 1 µg/mL.

A soft drink containing the plant finished product of the present invention can be manufactured according to a normal method of manufacturing the soft drink by the use of, for example, a raw material containing the plant finished product of the present invention. The plant finished product of the present invention may be added in the course of manufacturing or to a final product. The amount of the plant finished product of the present invention to be added is not particularly limited, but is preferably in the range of about 0.1 to 50% by weight, more preferably in the range of about 0.1 to 30% by weight. By adding the plant finished product of the present invention in such a manner, it is possible to impart a robust flavor and richness to the soft drink. Preferred examples of a soft drink include tea, barley tea, brown rice tea, blended tea of two or more of raw materials, and coffee.

Hereinbelow, representative plant finished products, foods, and drinks will be specifically described.
(Lignin-decomposed and Low-oxidized Grain)

When grain is subjected to high-temperature and high-pressure processing in low-oxygen conditions, oxidation of lipids is suppressed and lignin is decomposed to produce a lignin-derived phenol compound such as vanillin. Such a lignin-derived phenol compound, organic acid, and a product of the Maillard reaction make it possible to provide grain having a new flavor. For example, by processing an appropriate amount of malt by the use of liquid, gas, or fluid with high temperature and pressure (preferably, but not limited to, a temperature of 140 to 250° C. and a pressure of 0.25 to 4.5 MPa) for an appropriate time (preferably, but not limited to, 10 to 1,200 seconds), it is possible to obtain lignin-decomposed and low-oxidized malt. Since the thus obtained lignin-decomposed and low-oxidized malt has a robust aroma, a sweet or grain-like aroma, richness, and a savory taste, it can be used as a raw material of food or drink. In addition, such lignin-decomposed and low-oxidized malt also makes it possible to apply color to drink and food. Examples of grain to be used include, but not limited to, barley, wheat, rye, wild oat (*Avena sativa*), oat, rice, corn, Japanese barnyard millet, foxtail millet, millet (*Panicum miliaceum*), buckwheat, Job's tear, their germinated seeds, pre-emergence seeds, and parts of a plant body, such as straws, leaves, stems, and roots.

(Lignin-decomposed and Low-oxidized Wood)

When wood is subjected to high-temperature and high-pressure processing in low-oxygen conditions, oxidation of lipids is suppressed, and lignins are decomposed to produce a lignin-derived phenol compound such as vanillin. Such a lignin-derived phenol compound, organic acid, and product of the Maillard reaction make it possible to provide wood having a new flavor. For example, by processing an appropriate amount of oak by the use of liquid, gas, or fluid with high temperature and pressure (preferably, but not limited to, a temperature of 140 to 250° C. and a pressure of 0.25 to 4.5 MPa) for an appropriate time (preferably, but not limited to, 10 to 1,200 seconds), it is possible to obtain a lignin-decomposed and low-oxidized oak. Since the thus obtained lignin-decomposed and low-oxidized oak has a robust or sweet aroma, richness, and a savory taste, it can be used as a raw material of food and drink. In addition, the lignin-decomposed and low-oxidized oak also makes it possible to apply color to drink and food. Examples of wood to be used include, but not limited to, woody plants such as deciduous broad-leaved trees (e.g., cherry, Amur corktree (*Phellodendron amurense*), maple, horse chestnut, Japanese chestnut, Japanese pagoda tree, Japanese zelkova), evergreen conifers (e.g., Japanese cypress, Japanese cedar, and Japanese umbrella pine), bamboo, bamboo grass, their germinated or pre-emergence seeds, and parts of a plant body, such as flowers, leaves, stems, and roots.

(Lignin-decomposed and Low-oxidized Beans)

When beans are subjected to high-temperature and high-pressure processing in low-oxygen conditions, oxidation of lipids is suppressed, and lignins are decomposed to produce a lignin-derived phenol compound such as vanillin. Such a lignin-derived phenol compound, organic acid, and product of the Maillard reaction make it possible to provide beans having a new flavor. For example, by processing an appropriate amount of beans by the use of liquid, gas, or fluid with high temperature and pressure (preferably, but not limited to, a temperature of 140 to 250° C. and a pressure of 0.25 to 4.5 MPa) for an appropriate time (preferably, but not limited to, 10 to 1,200 seconds), it is possible to obtain lignin-decomposed and low-oxidized beans. Since the thus obtained lignin-decomposed and low-oxidized beans have a robust or sweet aroma, richness, and a savory taste, it can be used as a raw material of food and drink. In addition, the lignin-decomposed and low-oxidized beans also make it possible to apply color to drink and food. Examples of beans to be used include, but not limited to, soybean, red bean, pea, broad bean, kidney bean, their germinated or pre-emergence seeds, and parts of a plant body, such as leaves, stems, and roots.

(Lignin-decomposed and Low-oxidized Tea)

When tea is subjected to high-temperature and high-pressure processing in low-oxygen conditions, oxidation of lipids is suppressed, and lignins are decomposed to produce a lignin-derived phenol compound such as vanillin. Such a lignin-derived phenol compound, organic acid, and a product of the Maillard reaction make it possible to provide tea having new flavor and color. For example, by processing an appropriate amount of tea leaves by the use of liquid, gas, or fluid with high temperature and pressure (preferably, but not limited to, a temperature of 140 to 250° C. and a pressure of 0.25 to 4.5 MPa) for an appropriate time (preferably, but not limited to, 10 to 1,200 seconds), it is possible to obtain lignin-decomposed and low-oxidized tea leaves. Since the thus obtained lignin-decomposed and low-oxidized tea leaves have a robust or roast aroma, richness, and a savory taste, it can be used as a raw material of food and drink. In addition, the lignin-decomposed and low-oxidized tea leaves also make it possible to apply color to food and drink. Examples of tea to be used include, but not limited to, fresh tea leaves, tea seeds, tea plants, non-fermented tea leaves, semi-fermented tea leaves, and fermented tea leaves.

(Lignin-decomposed and Low-oxidized Coffee Beans)

When coffee beans are subjected to high-temperature and high-pressure processing in low-oxygen conditions, oxidation of lipid is suppressed and lignin is decomposed to produce a lignin-derived phenol compound such as vanillin. Such a lignin-derived phenol compound, organic acid, and a product of the Maillard reaction make it possible to provide coffee beans having a new flavor. For example, by processing an appropriate amount of fresh coffee beans by the use of liquid, gas, or fluid with high temperature and pressure (preferably, but not limited to, a temperature of 140 to 250° C. and a pressure of 0.25 to 4.5 MPa) for an appropriate time (preferably, but not limited to, 10 to 1,200 seconds), it is possible to obtain lignin-decomposed and low-oxidized coffee beans. Since the thus obtained lignin-decomposed and low-oxidized coffee beans have a robust aroma, richness, a savory taste, and a sour taste, it can be used as a raw material of food and drink. Coffee beans to be used are not particularly limited as long as they can provide coffee, and production areas and kinds thereof are not also particularly limited.

(Tea Drink)

A tea drink having a new flavor can also be manufactured using a lignin-containing material which has been subjected to high-temperature and high-pressure processing. For example, an appropriate amount of malt which has been subjected to high-temperature and high-pressure processing according to the present invention is added to a raw material(s) (the amount of the malt to be added is preferably, but not limited to, about 0.1 to 30% of the raw materials used; the malt is preferably added in the process of extraction with warm water or hot water or the process of blending to obtain a final product, but the timing of adding the malt is not limited thereto), and a tea drink is manufactured according to a method well known to those skilled in the art, thereby enabling a tea drink having a new flavor to be obtained. By manufacturing a tea drink in such a manner, it is possible to impart a robust aroma and a sweet or grain-like aroma to the tea drink and enhance richness and a savory taste of the tea drink. In addition, it is also possible to apply color to the tea drink, thereby enabling the color of a product to be controlled. A lignin-containing material to be used is not limited to malt, and examples of a lignin-containing material include, but not limited to: grains such as barley, wheat, rye, wild oat (*Avena sativa*), oat, rice, corn, Japanese barnyard millet, foxtail millet, millet (*Panicum miliaceum*), buckwheat, and Job's tear; woody plants such as deciduous broad-leaved trees (e.g., cherry, Amur corktree (*Phellodendron amurense*), maple, horse chestnut, Japanese chestnut, Japanese pagoda tree, Japanese zelkova), evergreen conifer trees (e.g., Japanese cypress, Japanese cedar, and Japanese umbrella pine), bamboo, and bamboo grass; beans such as soybean, red bean, pea, broad bean, and kidney bean; tea; coffee; and their germinated or pre-emergence seeds, and parts of a plant body, such as seed coats, flowers, leaves, stems, and roots. Examples of a tea drink include, but not limited to, barley tea, Genmaicha (brown rice tea; coarse tea mixed with roasted and popped rice), green tea, Chinese tea such as oolong tea, Dokudamicha (tea derived from leaves of *Houttuynia cordata*), Habucha (senna tea; tea derived from *Cassia* seed), Maccha (powdered green tea), Gyokuro (refined green tea), Kyobancha (coarse tea produced in Kyoto), Hojicha (roasted tea), Sencha Karigane (most popular green tea produced in Karigane, Japan), Gyokuro Karigane (refined green tea produced in Karigane, Miyazaki, Japan), Sencha (most popular green tea in Japan), Konacha (powdered tea), Tochucha (Du zhong tea), Genpicha (diet tea), rooibos tea, Job's tear tea, Shincha (new tea), and blended teas of two or more of raw materials.

(Soft Drink)

A soft drink having a new flavor can also be manufactured using a lignin-containing material which has been subjected to high-temperature and high-pressure processing. For example, an appropriate amount of malt which has been subjected to high-temperature and high-pressure processing according to the present invention is added to a raw material(s) (the amount of the malt to be added is preferably, but not limited to, about 0.1 to 30% of the raw materials used; the malt may be added at any timing during a manufacturing process, but is preferably added in the process of blending to obtain a final product), and a soft drink is manufactured according to a method well known to those skilled in the art, thereby enabling a soft drink having a new flavor to be obtained. By manufacturing a soft drink in such a manner, it is possible to impart a robust aroma and a sweet or grain-like aroma to the soft drink and enhance richness and a savory taste of the soft drink. In addition, it is also possible to apply color to the soft drink, thereby enabling the color of a product to be controlled. A lignin-containing material to be used is not limited to malt, and examples of a lignin-containing material include, but not limited to: grains such as barley, wheat, rye, wild oat (*Avena sativa*), oat, rice, corn, barnyard millet, foxtail millet, common millet, buckwheat, and pearl barley; woody plants such as broad-leaved deciduous trees (e.g., cherry, Amur corktree (*Phellodendron amurense*), maple, horse chestnut, Japanese chestnut, Japanese pagoda tree, and Japanese zelkova), evergreen conifer trees (e.g., Japanese cypress, Japanese cedar, and Japanese umbrella pine), bamboo, and bamboo grass; beans such as soybean, red bean, pea, broad bean, and kidney bean; tea; coffee; and their germinated or pre-emergence seeds, and parts or pieces of a plant body, such as seed coats, flowers, leaves, stems, and roots. Examples of a soft drink include, but not limited to, juice, carbonated beverages, malt beverages, lactic acid bacteria beverages, healthy drinks, sports drinks, amino acid drinks, and vitamin drinks.

(Coffee Drink)

A coffee drink having a new flavor can also be manufactured using a lignin-containing material which has been subjected to high-temperature and high-pressure processing. For example, an appropriate amount of malt which has been subjected to high-temperature and high-pressure processing according to the present invention is added to a raw material(s) (the amount of the malt to be added is preferably, but not limited to, about 0.1 to 10% of the raw materials used; the malt may be added at any timing during a manufacturing process, but is preferably added in the process of blending to obtain a final product), and a coffee drink is manufactured according to a method well known to those skilled in the art, thereby enabling a coffee drink having a new flavor to be obtained. By manufacturing a coffee drink in such a manner, it is possible to impart a sweet or grain-like aroma to the coffee drink and enhance richness and a savory taste of the coffee drink. A lignin-containing material to be used is not limited to malt, and examples of a lignin-containing material include, but not limited to: grains such as barley, wheat, rye, wild oat (*Avena sativa*), oat, rice, corn, Japanese barnyard millet, foxtail millet, millet (*Panicum miliaceum*), buckwheat, and Job's tear; woody plants such as deciduous broad-leaved trees (e.g., cherry, Amur corktree (*Phellodendron amurense*), maple, horse chestnut, Japanese chestnut, Japanese pagoda tree, and Japanese zelkova), evergreen conifer trees (e.g., Japanese cypress, Japanese cedar, and Japanese umbrella pine), bamboo, and bamboo grass; beans such as soybean, red bean, pea, broad bean, and kidney bean; tea; coffee; and their germinated or pre-emergence seeds, and parts of a plant body, such as seed coats, flowers, leaves, stems, and roots. Particularly, in a case where coffee beans are used, it is preferred that a raw material be comprised of only coffee beans which have been subjected to high-temperature and high-pressure processing according to the present invention, thereby enabling nonconventional coffee having a grain-like aroma and a rich taste to be obtained. Examples of a coffee drink include, but not limited to, coffee, coffee-based drinks, and soft drinks containing coffee.

(Confectionery)

Confectionery having a new flavor can also be manufactured using a raw material of food and drink obtained by subjecting a lignin-containing material to high-temperature and high-pressure processing. For example, an appropriate amount of malt which has been subjected to high-temperature and high-pressure processing according to the present invention is added to a raw material(s) (the amount of the malt to be added is 0.1% or more but 100% or less of the raw materials used; the malt may be added at any timing during a manufacturing process, or may be added to a final product), and confectionery is manufactured according to a method well known to those skilled in the art, thereby enabling confectionery having a new flavor to be obtained. By manufacturing confectionery in such a manner, it is possible to impart a robust aroma, a sweet or grain-like aroma to the confectionery and enhance richness and a savory taste of the confectionery. In addition, it is also possible to apply color to the confectionery, thereby enabling the color of a product to be controlled. A lignin-containing material to be used is not limited to malt, and examples of a lignin-containing material include, but not limited to: grains such as barley, wheat, rye, wild oat (*Avena sativa*), oat, rice, corn, Japanese barnyard millet, foxtail millet, millet (*Panicum miliaceum*), buckwheat, and Job's tear; woody plants such as deciduous broad-leaved trees (e.g., cherry, Amur corktree (*Phellodendron amurense*), maple, horse chestnut, Japanese chestnut, Japanese pagoda tree, and Japanese zelkova), evergreen conifer trees (e.g., Japanese cypress, Japanese cedar, and Japanese umbrella pine), bamboo, and bamboo grass; beans such as soybean, red bean, pea, broad bean, and kidney bean; tea; coffee; and their germinated or pre-emergence seeds, and parts of a plant body, such as seed coats, flowers, leaves, stems, and roots. Examples of confectionery include, but not limited to, puffed rice (rice snack), cookies, biscuits, rice crackers, arare (pellet-shaped rice crackers), okaki (glutinous rice crackers), candies, gums, and snack foods.

(Rice Food)

A rice food having a new flavor can also be manufactured using grain which has been subjected to high-temperature and high-pressure processing. For example, an appropriate amount of malt which has been subjected to high-temperature and high-pressure processing according to the present invention is added to a raw material(s) (the amount of the malt to be added is 0.1 to 100% of the raw materials used; the malt may be added at any timing during a manufacturing process, or may be added to a final product), and rice food is manufactured according to a normal method for manufacturing a rice food, thereby enabling a rice food having a new flavor to be obtained. By manufacturing a rice food in such a manner, it is possible to impart a robust aroma, a sweet or grain-like aroma to the rice food and enhance richness and a savory taste of the rice food. In addition, it is also possible to apply color to the rice food, thereby enabling the color of a product to be controlled. Grain to be used is not limited to malt, and examples of grain include, but not limited to, grains such as barley, wheat, rye, wild oat (*Avena sativa*), oat, rice, corn, Japanese barnyard millet, foxtail millet, millet (*Panicum miliaceum*), buckwheat, Job's tear, their germinated or pre-emergence seeds, and parts of a plant body, such as seed coats, flowers, leaves, stems, and roots. Examples of a rice food include, but not limited to, white rice, brown rice, rice-like food with husk, fried rice, takikomigohan (seasoned steamed rice with vegetables and meat), mugimeshi (rice cooked with barley), sobameshi (rice cooked with buckwheat), kamameshi (boiled rice placed in a small kettle), sekihan (rice cooked with red beans), torimeshi (rice cooked with chicken meat), gomokumeshi (rice cooked with various kinds of ingredients), matsutakegohan (rice cooked with matsutake-mushrooms), kakimeshi (rice cooked with oyster), taimeshi (rice cooked with sea-bream meat), takomeshi (rice cooked with octopus), and hotatemeshi (and rice cooked with scallop).

EXAMPLES

Hereinbelow, the present invention will be described with reference to Examples, but the present invention is not limited to these Examples. It is to be noted that the word "%" in Examples means "% by weight" unless otherwise specified.

Example 1

Analysis of Lignin-derived Phenol Compounds in Malt Subjected to High-Temperature and High-Pressure Processing High-temperature and high-pressure processing was carried out using a high-temperature and high-pressure steam treatment test machine (Hisaka Works, Ltd., HTS-25/140-8039) and a boiler (MIURA Co., Ltd., FH-100) in the following manner. 6 kg of European two-rowed barley malt was placed in a 12 liter basket made of SUS316 alloy, and the basket was enclosed in a 30 liter heat- and pressure-resistant container made of SUS316 alloy. High-temperature and high-pressure steam (2.7 MPa, 230° C.) was generated from water (oxygen concentration: 0.3 µg/mL) from which oxygen had been removed using oxygen reduction equipment (MIURA Co., Ltd., DOR-1000P), and the high-temperature and high-pressure steam was fed into the container for about 1 second to purge the air. Then, the container was kept under high temperature and pressure conditions (200° C., 1.4 MPa) for 60 seconds. After the treatment, the container was opened at the time when the container was cooled to 80° C. or less to take out the malt. The malt was air-dried all day and night. In this way, a malt finished product according to the present invention was obtained.

The amounts of a lignin-derived phenol compounds were compared among malts, malt which had been subjected to high-temperature and high-pressure processing according to the present invention, and specialty malts such as melanoidin malt and caramel malt in the following manner. Each of the malts was pulverized, and then 80 mL of water was added to 20 g of the powdered malt. The thus obtained mixture was subjected to extraction for 15 minutes at 65° C. and for 15 minutes at 75° C. Then, the amounts of a lignin-derived phenol compounds contained in the mixture subjected to extraction were measured in the following manner. To 20 g of the mixture, the same quantity of ethyl acetate was added. They were shaken for 10 minutes, and then an ethyl acetate layer was collected. This operation was repeated three times to obtain an ethyl acetate layer. The ethyl acetate layer was concentrated and dried using a rotary evaporator. The thus obtained concentrate was dissolved in 1 mL of methanol, and then 10 µL of the solution was subjected to HPLC to measure absorbance at 280 nm. Measurement was carried out using a high-performance liquid chromatography system (Shimadzu Corporation, CLASS-VP series), a Deverosil-C30 column (Nomura Chemical Co., Ltd., 4.6×150 mm), and a water-acetonitrile-based solvent. Analytical conditions are shown below.

Solution A: 0.05% TFA (trifluoroacetic acid) in water
Solution B: 0.05% TFA in 90% acetonitrile in water
Flow rate: 1 mL/min with a linear gradient of Solution B from 0 to 20% in 100 minutes The identification of compounds was based on comparisons of NMR, UV absorption curve, and retention time with those of reference materials commercially available. The quantity of a compound was calculated from the UV absorbance of a reference material.

The analytical results are shown in Table 1. It is to be noted that each value in Table 1 represents the amount (mg) of a compound contained in 100 g of malt.

TABLE 1

|  | Malt | Malt subjected to high-temperature and high-pressure processing | Melanoidin malt | Caramel malt |
|---|---|---|---|---|
| Protocatechuic aldehyde | 0.00 | 0.00 | 0.00 | 0.00 |
| Vanillic acid | 0.36 | 0.41 | 0.45 | 0.40 |
| Vanillin | 0.04 | 7.23 | 1.20 | 0.50 |
| P-coumaric acid | 0.16 | 4.52 | 1.40 | 0.00 |
| Syringaldehyde | 0.00 | 0.00 | 0.00 | 0.00 |
| Ferulic acid | 0.46 | 4.11 | 1.15 | 0.00 |

As is apparent from Table 1, malt normally contains only a trace amount of vanillin, and therefore vanillin is hardly detected in normal malt. Also, malt normally contains only a small amount of p-coumaric acid and ferulic acid. However, malt which had been subjected to high-temperature and high-pressure processing contained large amounts of lignin-derived phenol compounds such as vanillin, p-coumaric acid, and ferulic acid produced through lignin decomposition. From the result, it becomes apparent that by subjecting lignin-containing grain to high-temperature and high-pressure processing, it is possible to increase the amount of low-molecular phenol compounds. As shown in Table 1, in a case where malt as lignin-containing grain was subjected to high-temperature and high-pressure processing for 60 seconds at 200° C. at 1.4 MPa, the amount of vanillin was increased about 180-fold as compared to that of raw malt. In this case, vanillin accounts for 0.007% of the total weight of the grain. The production of a lignin-derived phenol compound due to high-temperature and high-pressure processing occurs not only in malt but also in, for example, grains such as barley, wheat, rye, wild oat (*Avena sativa*), oat, rice, corn, Japanese barnyard millet, foxtail millet, millet (*Panicum miliaceum*), buckwheat, Job's tear, their germinated or pre-emergence seeds and parts of a plant body, such as, leaves, stems, and roots. Although the amount and composition of lignin-derived phenol compounds to be obtained are slightly different from those of malt, such grains other than malt also give similar results to that of malt.

As is apparent from Table 1, specialty malts such as melanoidin malt and caramel malt also contain only a trace or small amount of lignin-derived phenol compounds.

By using high-temperature and high-pressure processing of the present invention, it is possible to decompose lignin contained in normal malt and significantly increase the amount of a lignin-derived phenol compound such as vanillin, thereby enabling a new plant finished product having a non-conventional material composition.

Example 2

Analysis of Lignin-derived Phenol Compounds Contained in Malt Husks Subjected to High-temperature and High-pressure Processing High-temperature and high-pressure processing was carried out using a high-temperature and high-pressure reactor manufactured by AKICO Co. Ltd. in the following manner. 40 g of water (oxygen concentration: 0.3 µg/mL) from which oxygen had been removed using oxygen reduction equipment (MIURA Co., LTd., DOR-1000P) was placed in a 400 milliliter heat- and pressure-resistant container made of SUS316 alloy. 30 g of malt husks were placed in a 200 milliliter basket made of SUS316 alloy, and the basket was set in the reactor without the basket being in contact with water. The malt husks were obtained from dry-grinding European two-rowed barley malt and fractionating the thus obtained malt powder using a sieve (0.7 mm). Nitrogen was fed into the reactor for about 5 seconds to purge air in the reactor, and then the reactor was kept under high temperature and pressure conditions (140° C. and 0.25 MPa, 200° C. and 1.4 MPa, or 250° C. and 4.5 MPa) for 60 seconds. Then, the reactor was cooled and opened at the time when the temperature of the reactor was reduced to 80° C. or less to take out the malt husks. In this way, malt husks according to the present invention was obtained.

To 20 g of the malt husks which had been subjected to high-temperature and high-pressure processing was added 80 mL of water. The thus obtained mixture was subjected to extraction for 15 minutes at 65° C. and for 15 minutes at 75° C. The amount of a lignin-derived phenol compound contained in the mixture subjected to extraction was measured in the same manner as in Example 1. The measurement results are shown in Table 2. It is to be noted that each value in Table 2 represents the amount (mg) of a compound contained in 100 g of malt husks.

TABLE 2

|  | Malt husk | Malt husk processed at 140° C. | Malt husk processed at 200° C. | Malt husk processed at 250° C. |
| --- | --- | --- | --- | --- |
| Protocatechuic aldehyde | 0.00 | 0.00 | 4.48 | 13.48 |
| Vanillic acid | 0.25 | 1.94 | 12.33 | 45.39 |
| Vanillin | 0.10 | 2.11 | 15.43 | 50.79 |
| p-Coumaric acid | 0.45 | 2.32 | 29.76 | 62.84 |
| Syringaldehyde | 0.00 | 0.00 | 0.17 | 7.71 |
| Ferulic acid | 0.60 | 1.88 | 14.39 | 47.01 |

Conventionally, when beer or happoushu is manufactured, grain husks are disposed as waste. However, in the case of grain, most of lignin thereof is localized in the husk. Therefore, by subjecting grain husks to high-temperature and high-pressure processing according to the present invention, it is possible to obtain the same amount or more of lignin-derived phenol compound as compared to a case where whole grain is processed. As shown in Table 2, in a case where grain husks or a fraction containing grain husks was subjected to high-temperature and high-pressure processing according to the present invention, decomposition products of lignins, that is, lignin-derived phenol compounds such as vanillin were produced in a significant amount.

These lignin-derived phenol compounds as represented by vanillin have an aroma, and therefore it is possible to impart a distinctive robust aroma to the grain finished product. Further, in a case where only grain husks with high lignin content were processed, a robust aroma of the finished product was enhanced because the ratio of lignin-derived phenol compounds relative to the total weight of the finished product was increased.

Example 3

Investigation of Suppression of Lipid Oxidation

Conventional specialty malt is normally manufactured by roasting a lignin-containing plant such as grain under the air. However, since high-temperature and high-pressure processing according to the present invention is carried out under the deaerated system, an obtained effect is different from the effect of a conventional specialty malt. That is, since a chemical reaction is carried out in low-oxygen conditions, the oxidation of lipids is suppressed, thereby enabling a low-oxidized grain finished product to be manufactured. According to the present invention, it is possible to minimize the contact with oxygen when grain is processed, thereby suppressing the oxidation of lipids contained in the grain.

According to the method described in Example 1, malt was subjected to high-temperature and high-pressure processing.

FIG. 1 shows the result of analyzing free fatty acids contained in malt, malts which had been subjected to high-temperature and high-pressure processing in three different conditions (180° C. and 0.9 MPa, 190° C. and 1.1 MPa, and 210° C. and 1.8 MPa) in the same manner as in Example 1, and specialty malts including melanoidin malt and caramel malt. The analysis of fatty acids was carried out in the following manner. Each of the malt, malts subjected to high-temperature and high-pressure processing, and specialty malts was pulverized, and then 80 mL of water was added to 20 g of the thus obtained malt powder. The mixture was subjected to extraction for 15 minutes at 65° C. and for 15 minutes at 75° C. To 100 µL of the mixture subjected to extraction were added 200 µL of 0.02 M 2-nitrophenylhydrazine hydrochloride in ethanol and 200 µL of 0.25 M 1-ethyl-3-(3-dimethylaminopropyl)carbodiimide hydrochloride in ethanol, and they were reacted for 20 minutes at 60° C. After the reaction, 200 µL of 10% NaOH-methanol solution was added thereto, and they were reacted for 15 minutes at 60° C. After they were cooled, 4 mL of 0.5 M HCl-0.03 M phosphoric acid solution was added thereto, and 5 mL of n-hexane was added to carry out the extraction. The hexane layer was collected, and then hexane was evaporated. The residue was dissolved in 0.5 mL of methanol to analyze fatty acids by HPLC. HPLC was carried out using a high performance liquid chromatography system (Shimadzu Corporation, CLASS-VP series and a YMC-PAC-FA column (6×250 mm) and water-acetonitrile-based solvents. Elution was carried out with 90% acetonitrile (pH 4.5) at a flow rate of 1.2 mL/min for 25 minutes, and absorbance was measured at 400 nm. The identification of substances was based on a comparison of retention time with reference materials commercially available.

Figure 2:
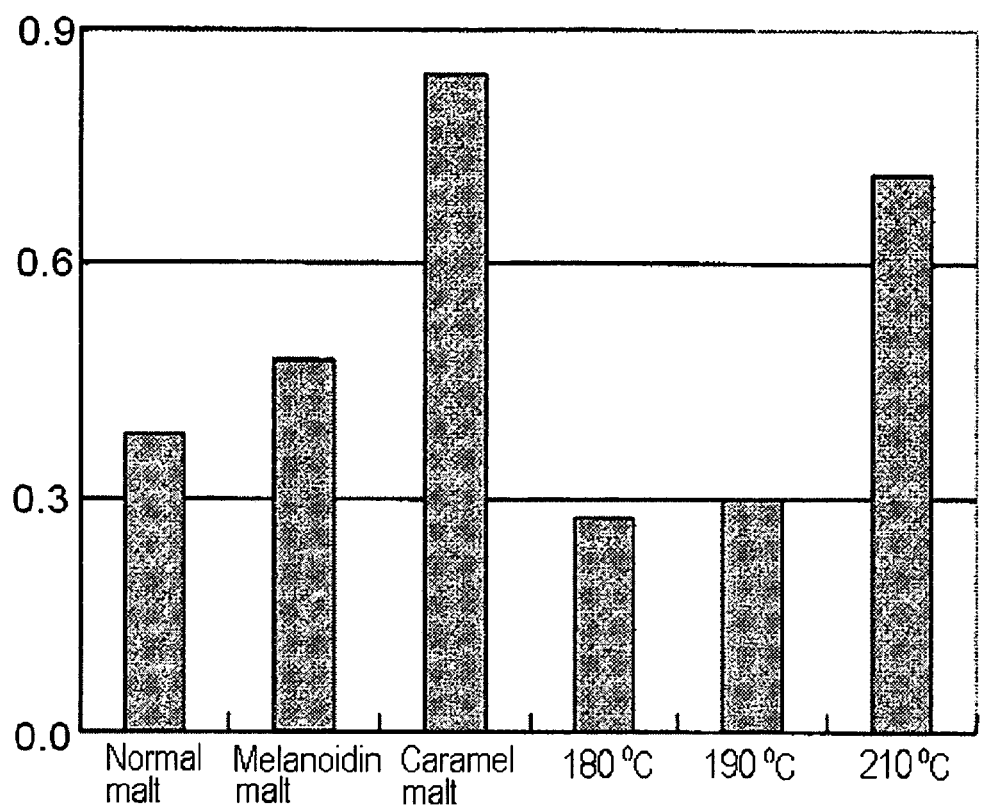
FIG. 2 shows the degree of peroxidation of lipids of European two-rowed barley malt, malt finished products obtained by subjecting the European two-rowed barley malt to high-temperature and high-pressure processing, and specialty malts.

FIG. 2 shows the amount of conjugated diene-type fatty acids, that is, the degree of excessive oxidation of fatty acids of each of the malt, malts which had been subjected to high-temperature and high-pressure processing under three different conditions as described in FIG. 1, and specialty malts. The degree of excessive oxidation of fatty acids was determined in the following manner. 5 mL of a solvent (methanol:ethanol=1:3) was added to 0.5 g of malt powder, and they were shaken for 5 minutes. Then, absorbance was measured at 234 nm. This is because a conjugated diene, that is, unsaturated fatty acid oxides have strong absorbance at 234 nm light.

Figure 3:
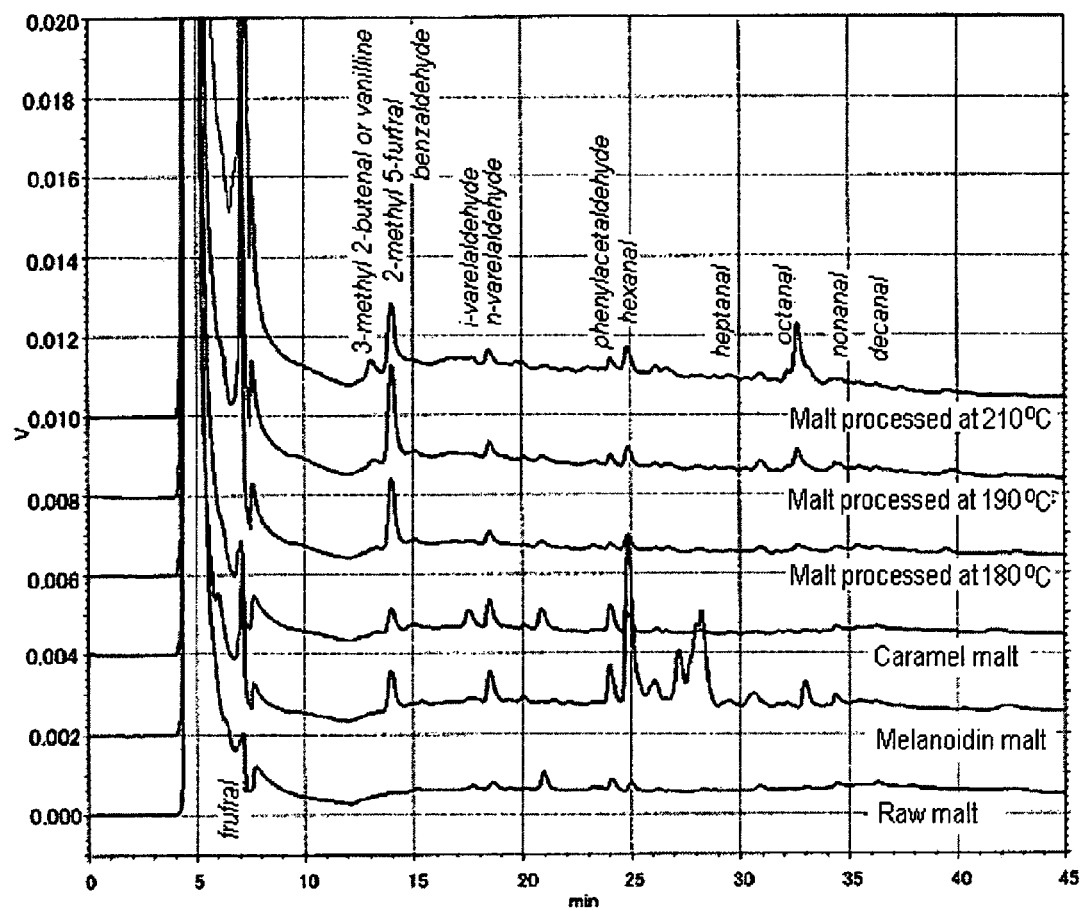
FIG. 3 shows the result of analyzing aldehydes contained in European two-rowed barley malt, malt finished products obtained by subjecting the European two-rowed barley malt to high-temperature and high-pressure processing, and specialty malts.

FIG. 3 shows the result of measurement of aldehydes contained in each of the malts, malts which had been subjected to high-temperature and high-pressure processing under three different conditions as described in FIG. 1, and specialty malts. Aldehydes were measured in the following manner. 50 mL of ethyl acetate was added to 5 g of malt powder to carry out the extraction, and then the ethyl acetate layer was concentrated to 100 μL. 400 μL of ethanol and 500 μL of 10 mM sodium bisulfite were added thereto, and then they were reacted for 60 minutes at room temperature. The mixture was subjected to HPLC for separation. Isoindole-2-sulfonic acid produced on postcolumn reaction of o-phthalaldehyde and ammonia, was measured by fluorescence detection (see Japanese Patent Laid-open No. Hei 4-208855).

As can be seen from FIGS. 1, 2, and 3, in a case where malt was subjected to high-temperature and high-pressure processing according to the present invention, the oxidation of lipids was suppressed as compared to conventional specialty malts. Further, in the case of conventional melanoidin malt, the amount of fatty acids liberated from lipids was relatively large, and fatty acid peroxides and aldehydes produced due to the oxidation of lipids were detected in very large amounts. In the case of caramel malt, the amount of lipid peroxides was about two times higher than that of normal malt, and the amount of aldehydes was also high. On the other hand, in the case of malts subjected to high-temperature and high-pressure processing, the amount of each of free long-chain fatty acids, lipid peroxides, and aldehydes was low. From this, it was confirmed that the oxidative reaction of lipids was suppressed. As described above, when conventional grain raw materials for liquors, such as melanoidin malt and caramel malt are manufactured, lipids are likely to deteriorate due to the oxidation. However, according to high-temperature and high-pressure processing of the present invention, it is possible to manufacture a grain material for liquors without deteriorating lipids due to the oxidation, that is, it is possible to manufacture low-oxidized grain having little product of oxidation.

Further, beer or happoushu was brewed using such a low-oxidized material. As a result, an unpleasant smell resulting from lipid oxidation was significantly reduced as compared to beer or happoushu brewed using conventional specialty malt such as melanoidin malt. In addition, a bitter or acrid taste on the tongue resulting from lipid oxides was also significantly reduced. The foam stability and flavor stability of the beer or happoushu were also improved. From the results, it was confirmed that the quality of the beer or happoushu was dramatically improved.

According to the present invention, the quality of a grain raw material for liquors is improved because it is possible to easily control the oxidative reaction of grain lipids. As a result, the quality of beer or happoushu such as flavor stability or foam stability is dramatically improved.

Example 4

Manufacture of Happoushu Using Malt

Happoushu was manufactured using a malt finished product according to the present invention as a raw material in the following manner. Malt was subjected to high-temperature and high-pressure processing (200° C., 1.4 MPa) according to the method described in Example 1 to obtain a malt finished product, and happoushu (product B) was manufactured using the malt finished product in an amount of 2.5% of all the raw materials used other than water (hereinafter, simply referred to as "raw materials used"). Specifically, 3 kg of malt which had been subjected to high-temperature and high-pressure processing (200° C., 1.4 MPa) was mixed with 27 kg of malt, and they were mashed with 150 L of water having a temperature of 65° C. for about 1 hour. The obtained mash was filtered, saccharified starch was added in such a manner that a malt ratio became 25%, and then they were stirred. Further, about 100 g of hops were added thereto. The resulting mixture was boiled for about 1 hour at 100° C., and was then cooled to 12° C. About 300 g of yeast for beer brewing was added to the mixture to begin fermentation. Fermentation was carried out for two weeks at 12° C. In this way, happoushu (product B) was obtained. In the same manner as described above, happoushu (product A) as a control was manufactured using only normal malt, and happoushu (product C) as a Conventional Example was manufactured using melanoidin malt in an amount of 10% of the raw materials used.

The amount of a lignin-derived phenol compound contained in the obtained happoushu was measured according to the method described in Example 1. The measurement results are shown in Table 3. Each value in Table 3 represents the concentration (μg/mL) of a compound contained in the product. As shown in Table 3, in the happoushu normally brewed, vanillin was not detected while in the happoushu manufactured using malt subjected to high-temperature and high-pressure processing, vanillin was detected and lignin-derived phenol compounds such as vanillic acid, p-coumaric acid, and ferulic acid were increased.

TABLE 3

|  | Product A | Product B | Product C |
|---|---|---|---|
| Protocatechuic aldehyde | 0.00 | 0.00 | 0.00 |
| Vanillic acid | 0.16 | 0.23 | 0.21 |
| Vanillin | 0.00 | 0.03 | 0.00 |
| p-Coumaric acid | 0.21 | 0.42 | 0.22 |
| Syringaldehyde | 0.00 | 0.00 | 0.00 |
| Ferulic acid | 0.36 | 0.57 | 0.33 |

The result of sensory evaluation is shown in Table 4. Sensory evaluation was carried out by 20 panelists. Each value in Table 4 represents the number of panelists who perceived a flavor expressed by each of the key words listed below when tasted the product.

TABLE 4

|  | Product A | Product B | Product C |
|---|---|---|---|
| Rich taste | 4 | 16 | 10 |
| Savory taste | 5 | 12 | 12 |
| Sweet aroma | 7 | 15 | 9 |
| Robust aroma | 4 | 12 | 9 |
| Unpleasant odor | 8 | 6 | 12 |
| Unpleasant aftertaste | 9 | 6 | 15 |

Further, for each of the products, color was measured. Color measurement was carried out by a method (EBC color chart) well known to those skilled in the art.

TABLE 5

|  | Product A | Product B | Product C |
|---|---|---|---|
| Color/Original wort extract (sugar concentration) 10% | 1.7 | 4.4 | 5.6 |

Example 5

Manufacture of Beer Using Malt

Beer was manufactured using a malt finished product according to the present invention as a raw material in the following manner. Malt was subjected to high-temperature and high-pressure processing (200° C., 1.4 MPa) according to the method described in Example 1 to obtain a malt finished product, and beer (product E) was manufactured using the malt finished product in an amount of 5% of all the raw materials used. Specifically, 5 kg of malt which had been subjected to high-temperature and high-pressure processing (200° C., 1.4 MPa) was mixed with 25 kg of malt, and they were mashed with 150 L of water having a temperature of 65° C. for about 1 hour. The obtained mash was filtered, and then about 100 g of hops were added thereto. The thus obtained mixture was boiled for about 1 hour at 100° C., and was then cooled to 12° C. About 300 g of yeast for beer brewing was added to the mixture to begin fermentation. Fermentation was carried out for two weeks at 12° C. In this way, beer (product E) was obtained. In the same manner as described above, beer (product D) as a control was manufactured using only normal malt.

The amount of a lignin-derived phenol compound contained in the beer was measured according to the method described in Example 1. The results are shown in Table 6. Each value in Table 6 represents the concentration (μg/mL) of a compound contained in the product. In the beer normally brewed, vanillin was not detected while in the beer manufactured using malt subjected to high-temperature and high-pressure processing, vanillin was detected and lignin-derived phenol compounds such as protocatechuic aldehyde, vanillic acid, p-coumaric acid, and ferulic acid were increased.

TABLE 6

|  | Product D | Product E |
|---|---|---|
| Protocatechuic aldehyde | 0.00 | 0.09 |
| Vanillic acid | 0.51 | 1.32 |
| Vanillin | 0.00 | 0.39 |
| p-Coumaric acid | 0.84 | 2.43 |
| Syringaldehyde | 0.00 | 0.00 |
| Ferulic acid | 1.27 | 2.44 |

The result of sensory evaluation is shown in Table 7. Sensory evaluation was carried out by 20 panelists. Each value in Table 7 represents the number of panelists who perceived a flavor expressed by each of the key words listed below when tasted the product.

TABLE 7

|  | Product D | Product E |
|---|---|---|
| Rich taste | 5 | 14 |
| Savory taste | 9 | 15 |
| Sweet aroma | 8 | 14 |
| Robust aroma | 5 | 18 |
| Unpleasant odor | 11 | 5 |
| Unpleasant aftertaste | 13 | 6 |

Further, for each of the products, color was measured. Color measurement was carried out by a method (EBC color chart) well known to those skilled in the art.

TABLE 8

|  | Product D | Product E |
|---|---|---|
| Color/Original wort extract (sugar concentration) 10% | 5.4 | 11.1 |

Example 6

Manufacture of Happoushu Using Rice Seeds

Happoushu was manufactured using a rice seed finished product according to the present invention as a raw material in the following manner. Rice seeds were subjected to high-temperature and high-pressure processing (200° C., 1.4 MPa) according to the method described in Example 1 to obtain a rice seed finished product. According to the method of brewing happoushu described in Example 4, happoushu (product G) was manufactured using the rice seed finished product in an amount of 2.5% of all the raw materials used. In the same manner as described above, happoushu (product F) as a control was manufactured using only normal malt.

The amount of a lignin-derived phenol compound contained in the happoushu was measured according to the method described in Example 1. The measurement results are shown in Table 9. Each value in Table 9 represents the concentration (μg/mL) of a compound contained in the product. In the happoushu normally brewed, vanillin was not detected while in the happoushu manufactured using rice seeds subjected to high-temperature and high-pressure processing, vanillin was detected and lignin-derived phenol compounds such as vanillic acid, p-coumaric acid, and ferulic acid were increased.

TABLE 9

|  | Product F | Product G |
|---|---|---|
| Protocatechuic aldehyde | 0.00 | 0.09 |
| Vanillic acid | 0.16 | 0.20 |
| Vanillin | 0.00 | 0.02 |
| p-Coumaric acid | 0.21 | 0.48 |
| Syringaldehyde | 0.00 | 0.00 |
| Ferulic acid | 0.36 | 0.43 |

The result of sensory evaluation is shown in Table 10. Sensory evaluation was carried out by 20 panelists. Each value in Table 10 represents the number of panelists who perceived a flavor expressed by each of the key words listed below when tasted the product.

TABLE 10

|  | Product F | Product G |
|---|---|---|
| Rich taste | 7 | 10 |
| Savory taste | 5 | 12 |
| Sweet aroma | 7 | 10 |
| Robust aroma | 4 | 13 |
| Unpleasant odor | 8 | 7 |
| Unpleasant aftertaste | 9 | 6 |

Further, for each of the products, color was measured. Color measurement was carried out by a method (EBC color chart) well known to those skilled in the art.

TABLE 11

|  | Product F | Product G |
| --- | --- | --- |
| Color/Original wort extract (sugar concentration) 10% | 1.7 | 3.4 |

Example 7

Manufacture of Happoushu Using Malt Husks

Happoushu was manufactured using a malt husk finished product according to the present invention as a raw material in the following manner. Malt husks were subjected to high-temperature and high-pressure processing (200° C., 1.4 MPa) according to the method described in Example 2 to obtain a malt husk finished product. According to the method of brewing happoushu described in Example 4, happoushu (product I) was manufactured using the malt husk finished product in an amount of 2.5% of all the raw materials used. In the same manner as described above, happoushu (product H) as a control was manufactured using only normal malt.

The amount of a lignin-derived phenol compound contained in the happoushu was measured according to the method described in Example 1. The measurement results are shown in Table 12. Each value in Table 12 represents the concentration (μg/mL) of a compound contained in the product. In the happoushu normally brewed, vanillin was not detected, while in the happoushu manufactured using malt husks subjected to high-temperature and high-pressure processing, vanillin was detected and lignin-derived phenol compounds such as vanillic acid, p-coumaric acid, and ferulic acid were increased.

TABLE 12

|  | Product H | Product I |
| --- | --- | --- |
| Protocatechuic aldehyde | 0.00 | 0.01 |
| Vanillic acid | 0.16 | 0.58 |
| Vanillin | 0.00 | 0.13 |
| p-Coumaric acid | 0.21 | 1.02 |
| Syringaldehyde | 0.00 | 0.00 |
| Ferulic acid | 0.36 | 1.54 |

The result of sensory evaluation is shown in Table 13. Sensory evaluation was carried out by 20 panelists. Each value in Table 13 represents the number of panelists who perceived a flavor expressed by each of the key words listed below when tasted the product.

TABLE 13

|  | Product H | Product I |
| --- | --- | --- |
| Rich taste | 7 | 15 |
| Savory taste | 5 | 12 |
| Sweet aroma | 7 | 11 |
| Robust aroma | 4 | 18 |
| Unpleasant odor | 8 | 6 |
| Unpleasant aftertaste | 9 | 6 |

Further, for each of the products, color was measured. Color measurement was carried out by a method (EBC color chart) well known to those skilled in the art.

TABLE 14

|  | Product H | Product I |
| --- | --- | --- |
| Color/Original wort extract (sugar concentration) 10% | 1.7 | 3.4 |

Example 8

Manufacture of Happoushu Using Malt Husks Subjected to High-temperature and High-pressure Processing Happoushu was manufactured using a malt husk finished product according to the present invention as a raw material in the following manner. Malt husks were subjected to high-temperature and high-pressure processing (400° C., 25 MPa) according to the method described in Example 2. Thereafter, the malt husks were taken out of a reactor, and were then freeze-dried to volatilize a burnt smell. In this way, a malt husk finished product processed with supercritical fluid was obtained. According to the method of brewing happoushu described in Example 4, happoushu (product K) was manufactured using the malt husk finished product in an amount of 2.5% of all the raw materials used. In the same manner as described above, happoushu (product J) as a control was manufactured using only normal malt.

The amount of a lignin-derived phenol compound contained in the happoushu was measured according to the method described in Example 1. The measurement results are shown in Table 15. Each value in Table 15 represents the concentration (μg/mL) of a compound contained in the product. In the happoushu normally brewed, vanillin was not detected, while in the happoushu manufactured using malt husks processed with supercritical fluid, vanillin was detected and lignin-derived phenol compounds such as protocatechuic aldehyde, vanillic acid, p-coumaric acid, syringaldehyde, and ferulic acid were increased.

TABLE 15

|  | Product J | Product K |
| --- | --- | --- |
| Protocatechuic aldehyde | 0.00 | 0.38 |
| Vanillic acid | 0.16 | 0.45 |
| Vanillin | 0.00 | 0.39 |
| p-Coumaric acid | 0.21 | 0.77 |
| Syringaldehyde | 0.00 | 0.08 |
| Ferulic acid | 0.36 | 0.75 |

The result of sensory evaluation is shown in Table 16. Sensory evaluation was carried out by 20 panelists. Each value in Table 16 represents the number of panelists who perceived a flavor expressed by each of the key words listed below when tasted the product.

TABLE 16

|  | Product J | Product K |
| --- | --- | --- |
| Rich taste | 7 | 15 |
| Savory taste | 5 | 7 |
| Sweet aroma | 7 | 7 |
| Robust aroma | 4 | 17 |
| Unpleasant odor | 8 | 7 |
| Unpleasant aftertaste | 9 | 8 |

Further, for each of the products, color was measured. Color measurement was carried out by a method (EBC color chart) well known to those skilled in the art.

TABLE 17

|  | Product J | Product K |
| --- | --- | --- |
| Color/Original wort extract (sugar concentration) 10% | 1.7 | 5.8 |

Example 9

Manufacture of Happoushu Using White Oak

Happoushu was manufactured using a white oak finished product according to the present invention as a raw material in the following manner. A white oak was subjected to high-temperature and high-pressure processing (200° C., 1.4 MPa) according to the method described in Example 1, and the white oak was pulverized using a pulverizer "RETSCH" (Nippon Seiki Co., Ltd., ZM100, Japan). According to the method of brewing happoushu described in Example 4, happoushu (product M) was manufactured using the pulverized white oak in an amount of 2% of all the raw materials used. In the same manner as described above, happoushu (product L) as a control was manufactured using only normal malt.

The amount of a lignin-derived phenol compound contained in the happoushu was measured according to the method described in Example 1. The measurement results are shown in Table 18. Each value in Table 18 represents the concentration (μg/mL) of a compound contained in the product. In the happoushu normally brewed, vanillin was not detected, while in the happoushu manufactured using an oak subjected to high-temperature and high-pressure processing, vanillin was detected and lignin-derived phenol compounds such as syringaldehyde, vanillic acid, p-coumaric acid, and ferulic acid were increased.

TABLE 18

|  | Product L | Product M |
| --- | --- | --- |
| Protocatechuic aldehyde | 0.00 | 0.00 |
| Vanillic acid | 0.16 | 0.22 |
| Vanillin | 0.00 | 0.04 |
| p-Coumaric acid | 0.21 | 0.26 |
| Syringaldehyde | 0.00 | 0.11 |
| Ferulic acid | 0.36 | 0.46 |

The result of sensory evaluation is shown in Table 19. Sensory evaluation was carried out by 20 panelists. Each value in Table 19 represents the number of panelists who perceived a flavor expressed by each of the key words listed below when tasted the product.

TABLE 19

|  | Product L | Product M |
| --- | --- | --- |
| Rich taste | 7 | 13 |
| Savory taste | 5 | 10 |
| Sweet aroma | 7 | 10 |
| Robust aroma | 4 | 15 |
| Unpleasant odor | 8 | 8 |
| Unpleasant aftertaste | 9 | 8 |

Further, for each of the products, color was measured. Color measurement was carried out by a method (EBC color chart) well known to those skilled in the art.

TABLE 20

|  | Product L | Product M |
| --- | --- | --- |
| Color/Original wort extract (sugar concentration) 10% | 1.7 | 3.6 |

Example 10

Manufacture of Happoushu Using Bamboo

Happoushu was manufactured using a bamboo finished product according to the present invention as a raw material in the following manner. Bamboo was subjected to high-temperature and high-pressure processing (200° C., 1.4 MPa) according to the method described in Example 1, and the bamboo was pulverized using a pulverizer "RETSCH" (Nippon Seiki Co., Ltd., ZM100, Japan). According to the method of brewing happoushu described in Example 4, happoushu (product O) was manufactured using the pulverized bamboo in an amount of 2% of all the raw materials used. In the same manner as described above, happoushu (product N) as a control was manufactured using only normal malt.

The amount of a lignin-derived phenol compound contained in the happoushu was measured according to the method described in Example 1. The measurement results are shown in Table 21. Each value in Table 21 represents the concentration (μg/mL) of a compound contained in the product. In the happoushu normally brewed, vanillin was not detected, while in the happoushu manufactured using bamboo subjected to high-temperature and high-pressure processing, vanillin was detected and lignin-derived phenol compounds such as vanillic acid, p-coumaric acid, syringaldehyde, and ferulic acid were increased.

TABLE 21

|  | Product N | Product O |
| --- | --- | --- |
| Protocatechuic aldehyde | 0.00 | 0.00 |
| Vanillic acid | 0.16 | 0.45 |
| Vanillin | 0.00 | 0.03 |
| p-Coumaric acid | 0.21 | 0.52 |
| Syringaldehyde | 0.00 | 0.03 |
| Ferulic acid | 0.36 | 0.66 |

The result of sensory evaluation is shown in Table 22. Sensory evaluation was carried out by 20 panelists. Each value in Table 22 represents the number of panelists who perceived a flavor expressed by each of the key words listed below when tasted the product.

TABLE 22

|  | Product N | Product O |
| --- | --- | --- |
| Rich taste | 7 | 8 |
| Savory taste | 5 | 9 |
| Sweet aroma | 7 | 10 |
| Robust aroma | 4 | 11 |
| Unpleasant odor | 8 | 4 |
| Unpleasant aftertaste | 9 | 5 |

Further, for each of the products, color was measured. Color measurement was carried out by a method (EBC color chart) well known to those skilled in the art.

TABLE 23

|  | Product N | Product O |
|---|---|---|
| Color/Original wort extract (sugar concentration) 10% | 1.7 | 3.2 |

From the results described above, it becomes apparent that the use of a plant finished product according to the present invention makes it possible to impart a robust aroma and a sweet or grain-like aroma resulting from lignin-derived phenol compounds to happoushu or beer. In addition, since aromatic components are increased, the balance of flavor of happoushu or beer is changed, thereby enhancing the depth of flavor, richness, and a savory taste of happoushu or beer. Further, it is also possible to impart color to a product, thereby enabling the color of the product to be controlled. It can be considered that these effects described above also greatly result from the change in the composition of happoushu or beer due to the use of malt subjected to high-temperature and high-pressure processing which contains a product of the Maillard reaction and increased organic acids in addition to the products of decomposition of lignin. Furthermore, it becomes apparent that the use of a plant finished product according to the present invention makes it possible to suppress the oxidation of substances contained in a plant such as malt. Particularly, since the oxidation of easily-oxidizable lipid is suppressed, the feeling of happoushu or beer on the tongue becomes better, thereby improving the quaffability thereof. Moreover, since an unpleasant smell such as a lipid-oxidized unpleasant smell is significantly reduced, the flavor of happoushu or beer is markedly improved.

Example 11

Manufacture of Happoushu Using Straws

Happoushu was manufactured using a straw finished product of the present invention as a raw material in the following manner. Stems of barley (straws) were subjected to high-temperature and high-pressure processing (200° C., 1.4 MPa) according to the method described in Example 1, and the straws were pulverized using a pulverizer "RETSCH" (Nippon Seiki Co., Ltd., ZM100, Japan). According to the method of brewing happoushu described in Example 4, happoushu was manufactured using the pulverized straws in an amount of 2% of all the raw materials used.

By using the straw finished product, a robust aroma resulting from lignin-derived phenol compounds was imparted to the happoushu. Further, aromatic components were increased, and therefore the balance of flavor in the happoushu was changed, thereby enhancing the depth of flavor and richness of the happoushu. Furthermore, color was imparted to the product, thereby enabling the color of the product to be controlled. It can be considered that these effects also greatly result from the change in the composition of the happoushu due to the use of the finished product containing a product of the Maillard reaction and increased organic acids in addition to the products of decomposition of lignin. As described above, by using the straw finished product, a robust aroma and richness resulting from lignin-derived phenol compounds were imparted to the product, thereby enabling a new flavor with an aroma to be created.

Example 12

Malt Finished Product Obtained Through High-Temperature and High-Pressure Processing European two-rowed malt was subjected to high-temperature and high-pressure processing for 1 minute at 200° C. at 0.6 MPa using a twin-screw extruder (Japan Steel Works, Ltd., TEX30F) to obtain a malt finished product according to the present invention. The thus obtained malt finished product could be easily dissolved in water (including heated water) without further pulverization.

For the malt finished product, various analyses were carried out according to the method described in Example 1. As a result, it was confirmed that lignin-derived phenol compounds were produced and the oxidation of lipids was suppressed at the same level of the malt finished product of Example 1.

TABLE 24

| weight mg/100 g of malt | Normal raw malt | Malt finished product of Example 12 |
|---|---|---|
| Protocatechuic aldehyde | 0.00 | 0.00 |
| Vanillic acid | 0.36 | 0.43 |
| Vanillin | 0.04 | 6.51 |
| p-Coumaric acid | 0.16 | 4.11 |
| Syringaldehyde | 0.00 | 0.00 |
| Ferulic acid | 0.46 | 3.89 |

The use of a twin-screw extruder made it possible to continuously process malt while keeping the effect of high-temperature and high-pressure processing described in Example 1, thereby enabling a malt finished product to be effectively obtained. Since a twin-screw extruder can carry out not only high-temperature and high-pressure processing but also pulverizing, molding, and drying, a plant finished product manufactured using an extruder can be uniformly dissolved in water (including heated water) without carrying out additional steps such as a drying step and a pulverizing step. Therefore, by using an extruder, a plant finished product according to the present invention becomes more convenient to use as a raw material for liquors or foods.

Example 13

Manufacture of Happoushu Using Malt

Happoushu was manufactured using a malt finished product according to the present invention as a raw material in the following manner. Malt was subjected to high-temperature and high-pressure processing according to the method described in Example 12 to obtain a malt finished product, and happoushu was manufactured using the malt finished product in an amount of 2.5% of all the raw materials used other than water (hereinafter, simply referred to as "raw materials used"). Specifically, 3 kg of malt which had been subjected to high-temperature and high-pressure processing according to the method described in Example 12 was mixed with 27 kg of malt, and they were mashed with 150 L of water having a temperature of 65° C. for about 1 hour. The obtained mash was filtered, saccharified starch was added in such a manner that a malt ratio became 25%, and then they were stirred. Further, about 100 g of hops were added thereto. The resulting mixture was boiled for about 1 hour at 100° C., and was then cooled to 12° C. About 300 g of yeast for beer brewing was added to the mixture to begin fermentation. Fermentation was carried out for two weeks at 12° C. In this way, happoushu was obtained. In the same manner as described above, happoushu as a control (Comparative Example) was manufactured using only normal malt. The effect of the malt finished product according to the present invention was evaluated by making comparison between Example 13 and Comparative Example.

TABLE 25

| Weight mg/100 g of malt | happoushu of Comparative Example | happoushu of Example 13 |
|---|---|---|
| Protocatechuic aldehyde | 0.00 | 0.00 |
| Vanillic acid | 0.16 | 0.21 |
| Vanillin | 0.00 | 0.03 |
| p-Coumaric acid | 0.21 | 0.25 |
| Syringaldehyde | 0.00 | 0.00 |
| Ferulic acid | 0.36 | 0.48 |

By using the plant finished product according to the present invention, a robust aroma and a sweet or grain-like aroma resulting from lignin-derived phenol compounds were imparted to the happoushu. Further, aromatic components were increased, and therefore the balance of flavor of the happoushu was changed, thereby enhancing the depth of flavor, richness, and a savory taste of the happoushu. Furthermore, color was imparted to the product, thereby enabling the color of the product to be controlled.

The result of sensory evaluation is shown in Table 26. Sensory evaluation was carried out by 20 panelists. Each value in Table 26 represents the number of panelists who perceived a flavor expressed by each of the key words listed below when tasted the product.

TABLE 26

| Number of panelists/20 panelists | happoushu of Comparative Example | happoushu of Example 13 |
|---|---|---|
| Rich taste | 4 | 10 |
| Savory taste | 5 | 11 |
| Sweet aroma | 7 | 16 |
| Robust aroma | 4 | 9 |
| Unpleasant odor | 8 | 3 |
| Unpleasant aftertaste | 9 | 5 |

Further, for each of the products, color was measured. Color measurement was carried out by a method (EBC color chart) well known to those skilled in the art.

TABLE 27

| EBC color chart | happoushu of Comparative Example | happoushu of Example 13 |
|---|---|---|
| Color/Extract (sugar concentration) 10% | 1.7 | 3.5 |

It can be considered that these effects also greatly result from that the change in the composition of the happoushu due to the use of malt subjected to high-temperature and high-pressure processing which contains a product of the Maillard reaction and increased organic acids in addition to the products of lignin decomposition. Further, by using the plant finished product according to the present invention, the oxidation of substances contained in a plant such as malt was suppressed. Particularly, the oxidation of easily-oxidizable lipids was suppressed, and therefore the feeling of the happoushu on the tongue became better, thereby improving the quaffability thereof. Moreover, an unpleasant smell such as a lipid-oxidized smell was significantly reduced, thereby markedly improving the flavor of the happoushu.

Example 14

Manufacture of Beer Using Malt

Beer was manufactured using a malt finished product according to the present invention as a raw material in the following manner. Malt was subjected to high-temperature and high-pressure processing according to the method described in Example 12 to obtain a malt finished product, and beer was manufactured using the malt finished product in an amount of 5% of all the raw materials used. Specifically, 5 kg of malt which had been subjected to high-temperature and high-pressure processing according to the method described in Example 12 was mixed with 25 kg of malt, and they were mashed with 150 L of water having a temperature of 65° C. for about 1 hour. The obtained mash was filtered, and about 100 g of hops were added thereto. The resulting mixture was boiled for about 1 hour at 100° C., and was then cooled to 12° C. About 300 g of yeast for beer brewing was added to the mixture to begin fermentation. Fermentation was carried out for two weeks at 12° C. In this way, beer was obtained. In the same manner as described above, beer as a control (Comparative Example) was manufactured using only normal malt. The effect of the malt finished product according to the present invention was evaluated by making comparison between Example 14 and Comparative Example.

TABLE 28

| µg/mL | Beer of Comparative Example | Beer of Example 14 |
|---|---|---|
| Protocatechuic aldehyde | 0.00 | 0.00 |
| Vanillic acid | 0.51 | 0.77 |
| Vanillin | 0.00 | 0.12 |
| p-Coumaric acid | 0.84 | 1.42 |
| Syringaldehyde | 0.00 | 0.00 |
| Ferulic acid | 1.27 | 1.55 |

By using the plant finished product according to the present invention, a robust aroma and a sweet or grain-like aroma resulting from lignin-derived phenol compounds were imparted to the beer. Further, aromatic components were increased, and therefore the balance of flavor of the beer was changed, thereby enhancing the depth of flavor, richness, and a savory taste of the beer. Furthermore, color was imparted to the beer, thereby enabling the color of the beer to be controlled.

The result of sensory evaluation is shown in Table 29. Sensory evaluation was carried out by 20 panelists. Each value in Table 29 represents the number of panelists who perceived a flavor expressed by each of the key words listed below when tasted the product.

TABLE 29

| Number of panelists/20 panelists | Beer of Comparative Example | Beer of Example 14 |
|---|---|---|
| Rich taste | 5 | 13 |
| Savory taste | 9 | 12 |
| Sweet aroma | 8 | 16 |
| Robust aroma | 5 | 11 |
| Unpleasant odor | 11 | 5 |
| Unpleasant aftertaste | 13 | 5 |

Further, for each of the products, color was measured. Color measurement was carried out by a method (EBC color chart) well known to those skilled in the art.

TABLE 30

| EBC color chart | Beer of Comparative Example | Beer of Example 14 |
|---|---|---|
| Color/Extract (sugar concentration) 10% | 5.4 | 7.9 |

It can be considered that these effects also greatly result from that the change in the composition of the beer due to the use of malt subjected to high-temperature and high-pressure processing which contains a product of the Maillard reaction and increased organic acids in addition to the products of lignin decomposition. Further, by using the plant finished product according to the present invention, the oxidation of substances contained in a plant such as malt was suppressed. Particularly, the oxidation of easily-oxidizable lipids was suppressed, and therefore the feeling of the beer on the tongue became better, thereby improving the quaffability thereof. Moreover, an unpleasant smell such as a lipid-oxidized smell was significantly reduced, thereby markedly improving the flavor of the beer.

Example 15

Manufacture of Happoushu Using Rice Seeds

Happoushu was manufactured using a rice seed finished product according to the present invention as a raw material in the following manner. Rice seeds were subjected to high-temperature and high-pressure processing according to the method described in Example 12 to obtain a rice seed finished product. According to the method of brewing happoushu described in Example 13, happoushu was manufactured using the rice seed finished product in an amount of 2.5% of all the raw materials used. In the same manner as described above, happoushu as a control (Comparative Example) was manufactured using only normal malt. The effect of the rice seed finished product according to the present invention was evaluated by making comparison between Example 15 and Comparative Example.

TABLE 31

| μg/mL | happoushu of Comparative Example | happoushu of Example 15 |
| --- | --- | --- |
| Protocatechuic aldehyde | 0.00 | 0.00 |
| Vanillic acid | 0.16 | 0.18 |
| Vanillin | 0.00 | 0.02 |
| p-Coumaric acid | 0.21 | 0.44 |
| Syringaldehyde | 0.00 | 0.00 |
| Ferulic acid | 0.36 | 0.40 |

By using the plant finished product according to the present invention, a robust aroma and a sweet or grain-like aroma resulting from lignin-derived phenol compounds were imparted to the happoushu. Further, aromatic components were increased, and therefore the balance of flavor of the happoushu was changed, thereby enhancing the depth of flavor, richness, and a savory taste of the happoushu. Furthermore, color was imparted to the happoushu, thereby enabling the color of the happoushu to be controlled.

The result of sensory evaluation is shown in Table 32. Sensory evaluation was carried out by 20 panelists. Each value in Table 32 represents the number of panelists who perceived a flavor expressed by each of the key words listed below when tasted the product.

TABLE 32

| Number of panelists/20 panelists | happoushu of Comparative Example | happoushu of Example 15 |
| --- | --- | --- |
| Rich taste | 7 | 10 |
| Savory taste | 5 | 10 |

TABLE 32-continued

| Number of panelists/20 panelists | happoushu of Comparative Example | happoushu of Example 15 |
| --- | --- | --- |
| Sweet aroma | 7 | 12 |
| Robust aroma | 4 | 9 |
| Unpleasant odor | 8 | 5 |
| Unpleasant aftertaste | 9 | 3 |

Further, for each of the products, color was measured. Color measurement was carried out by a method (EBC color chart) well known to those skilled in the art.

TABLE 33

| EBC color chart | happoushu of Comparative Example | happoushu of Example 15 |
| --- | --- | --- |
| Color/Extract (sugar concentration) 10% | 1.7 | 3.2 |

It can be considered that these effects also greatly result from that the change in the composition of the happoushu due to the use of rice seeds subjected to high-temperature and high-pressure processing which contains a product of the Maillard reaction and increased organic acids in addition to the products of lignin decomposition. Further, by using the plant finished product according to the present invention, the oxidation of substances contained in a plant such as rice seeds was suppressed. Particularly, the oxidation of easily-oxidizable lipids was suppressed, and therefore the feeling of the happoushu on the tongue became better, thereby improving the quaffability thereof. Moreover, an unpleasant smell such as a lipid-oxidized smell was significantly reduced, thereby markedly improving the flavor of the happoushu.

In Examples 12 to 15, a twin-screw extruder newly developed by the present inventors was used. The twin-screw extruder is capable of keeping the inside of a cylinder at high temperature and pressure. By using such a twin-screw extruder, it is possible to continuously process a raw material and carry out not only high-temperature and high-pressure processing but also pulverizing and drying. This is a novel method of processing a plant under high temperature and pressure conditions. A plant finished product according to the present invention can be easily dissolved in water (hot water) without subjecting the plant finished product to an additional pulverizing step or the like. According to such a novel method, it is possible to continuously process a raw material while keeping the effect of high-temperature and high-pressure processing described in Examples 1 to 11. In addition, it is not necessary to pulverize a raw material and dry a plant finished product after high-temperature and high-pressure processing, thereby extremely improving productivity.

Example 16

Manufacture of Happoushu Using Straws

Happoushu was manufactured using a straw finished product according to the present invention as a raw material in the following manner. Stems of barley (straws) were subjected to high-temperature and high-pressure processing (200° C., 1.4 MPa) according to the method described in Example 1, and the straws were pulverized using a pulverizer "RETSCH" (Nippon Seiki Co., Ltd., ZM100, Japan). According to the method of brewing happoushu described in Example 4, happoushu was manufactured using the pulverized straws in an amount of 2% of all the raw materials used.

The amount of lignin-derived phenol compounds contained in the happoushu was measured according to the method described in Example 1. The measurement results are shown in Table 34. Each value in Table 34 represents the concentration (μg/mL) of a compound contained in the product. In the happoushu normally brewed, vanillin was not detected, while in the happoushu manufactured using straws subjected to high-temperature and high-pressure processing, vanillin was detected and lignin-derived phenol compounds such as vanillic acid, p-coumaric acid, syringaldehyde, and ferulic acid were increased.

TABLE 34

|  | happoushu of Comparative Example | happoushu of Example |
|---|---|---|
| Protocatechuic aldehyde | 0.00 | 0.00 |
| Vanillic acid | 0.16 | 0.31 |
| Vanillin | 0.00 | 0.07 |
| p-Coumaric acid | 0.21 | 0.72 |
| Syringaldehyde | 0.00 | 0.00 |
| Ferulic acid | 0.36 | 0.78 |

The result of sensory evaluation is shown in Table 35. Sensory evaluation was carried out by 20 panelists. Each value in Table 35 represents the number of panelists who perceived a flavor expressed by each of the key words listed below when tasted the product.

TABLE 35

| Number of panelists/20 panelists | happoushu of Comparative Example | happoushu of Example |
|---|---|---|
| Rich taste | 7 | 12 |
| Savory taste | 5 | 13 |
| Sweet aroma | 7 | 13 |
| Robust aroma | 4 | 15 |
| Unpleasant odor | 8 | 7 |
| Unpleasant aftertaste | 9 | 6 |

Further, for each of the products, color was measured. Color measurement was carried out by a method (EBC color chart) well known to those skilled in the art.

TABLE 36

| EBC color chart | happoushu of Comparative Example | happoushu of Example |
|---|---|---|
| Color/Original wort extract (sugar concentration) 10% | 1.7 | 3.1 |

By using the plant finished product according to the present invention, a robust aroma resulting from lignin-derived phenol compounds was imparted to the happoushu. Further, aromatic components were increased, and therefore the balance of flavor of the happoushu was changed, thereby enhancing the depth of flavor and richness of the happoushu. Furthermore, color was imparted to the product, thereby enabling the color of the product to be controlled. It can be considered that these effects also greatly result from that the change in composition of the happoushu due to the use of the finished product which contains a product of the Maillard reaction and increased organic acids in addition to the products of lignin decomposition. As described above, by using the plant finished product, a robust aroma and richness resulting from lignin-derived phenol compounds were imparted to the product, thereby enabling a new flavor having an aroma to be created.

Example 17

Manufacture of Whiskey Using Malt

Whiskey was manufactured using a malt finished product according to the present invention as a raw material in the following manner. Malt was subjected to high-temperature and high-pressure processing (200° C., 1.4 MPa) according to the method described in Example 1 to obtain a malt finished product, and whiskey was manufactured using the malt finished product in an amount of 5% of all the raw materials used. Specifically, 5 kg of malt subjected to high-temperature and high-pressure processing (200° C., 1.4 MPa) was mixed with 25 kg of malt, and they were mashed for about 1 hour with 150 L of water having a temperature of 65° C. The resulting mash was filtered, and then the filtrate was distilled to obtain new pot (distillate). The new pot was put in a barrel made of white oak and stored for 3 years. In this way, whiskey was obtained.

Sensory evaluation was carried out by five panelists to make an assessment as to the flavor of the whiskey. As a result, it was found that the malt finished product according to the present invention imparted a robust aroma resulting from lignin-derived phenol compounds to the whiskey. In addition, it was also found that the malt finished product had the effect of smoothly spreading the aroma, making the taste mild, and adding richness and a savory taste. It can be considered that these effects also greatly result from the change in the composition of the whiskey due to the use of the finished product containing a product of the Maillard reaction and increased organic acids in addition to the products of lignin decomposition.

Example 18

Manufacture of Whiskey Using Malt Husks

Whiskey was manufactured using a malt husk finished product according to the present invention as a raw material in the following manner. Malt husks were subjected to high-temperature and high-pressure processing (200° C., 1.4 MPa) according to the method described in Example 2 to obtain a malt husk finished product, and whiskey was manufactured using the malt husk finished product in an amount of 5% of all the raw materials used. Specifically, 5 kg of malt husks subjected to high-temperature and high-pressure processing (200° C., 1.4 MPa) was mixed with 25 kg of malt, and they were mashed for about 1 hour with 150 L of water having a temperature of 65° C. The resulting mash was filtered, and then the filtrate was distilled to obtain a new pot (distillate). The new pot was put in a barrel made of white oak and stored for 3 years. In this way, whiskey was obtained.

Sensory evaluation was carried out by five panelists to make an assessment as to the flavor of the whiskey. As a result, it was found that the malt husk finished product according to the present invention imparted a robust aroma resulting from lignin-derived phenol compounds to the whiskey. In addition, it was also found that the malt husk finished product had the effect of smoothly spreading the aroma, making the taste mild, and adding richness and a savory taste. It can be considered that these effects also greatly result from the change in the composition of the whiskey due to the use of the finished product containing a product of the Maillard reaction, pyrazines, and organic acids in addition to the products of lignin decomposition.

Example 19

Manufacture of Shochu (Japanese White Liquor) Using Barley Seeds

Shochu was manufactured using a barley seed finished product according to the present invention as a raw material in the following manner. Barley seeds were subjected to high-temperature and high-pressure processing (200° C., 1.4 MPa) according to the method described in Example 1 to obtain a barley seed finished product, and shochu was manufactured using the barley seed finished product. Specifically, 100 mg of dry yeast and 3 L of water were added to 2.5 kg of dry Koji, and they were stirred. The obtained mixture was left at rest for 4 days at 25° C. To the mixture were added 5 kg of pulverized barley seeds which had been subjected to high-temperature and high-pressure processing and 7.5 L of water, and then the mixture was stirred. The obtained mixture was left at rest for two weeks at 25° C., and was then distilled to obtain shochu.

Sensory evaluation was carried out by five panelists to make an assessment as to the flavor of the shochu. As a result, it was found that the barley seed finished product according to the present invention imparted a robust aroma resulting from lignin-derived phenol compounds to the shochu. In addition, it was also found that the barley seed finished product had the effect of imparting a sweet and robust aroma, making the taste mild, and adding richness and a savory taste. It can be considered that these effects also greatly result from the change in the composition of the shochu due to the use of the finished product containing a product of the Maillard reaction, pyrazines, and organic acids in addition to the products of lignin decomposition.

Example 20

Manufacture of Spirits Using Rice Seed Husks

Spirits was manufactured using a rice seed husk finished product according to the present invention as a raw material in the following manner. Rice seed husks were subjected to high-temperature and high-pressure processing (200° C., 1.4 MPa) according to the method described in Example 2 to obtain a rice seed husk finished product, and spirits was manufactured using the rice seed husk finished product in an amount of 10% of all the raw materials used. Specifically, 5 kg of rice seed husks subjected to high-temperature and high-pressure processing (200° C., 1.4 MPa) were mixed with 45 kg of malt, and they were mashed for about 1 hour with 200 L of water having a temperature of 65° C. The resulting mash was filtered, and then the filtrate was subjected to continuous distillation to obtain spirits.

Sensory evaluation was carried out by five panelists to make an assessment as to the flavor of the spirits. As a result, it was found that the rice seed husk finished product according to the present invention imparted a robust aroma resulting from lignin-derived phenol compounds to the spirits. In addition, it was also found that the rice seed husk finished product had the effect of smoothly spreading the aroma, making the taste mild, and adding richness and a savory taste. It can be considered that these effects also greatly result from the change in the composition of the spirits due to the use of the finished product containing a product of the Maillard reaction, pyrazines, and organic acids in addition to the products of lignin decomposition.

Example 21

Manufacture of Spirits Using White Oak

Spirits was manufactured using a white oak finished product according to the present invention in the following manner. In place of using the malt husks, white oak was subjected to high-temperature and high-pressure processing (200° C., 1.4 MPa) according to the method described in Example 2, and the resulting white oak finished product was cut into a cube (1 cm per side). The white oak finished product was immersed in grain spirits in such a manner that the amount of the white oak finished product became 0.1% with respect to the amount of the grain spirits. In this way, spirits was obtained.

Sensory evaluation was carried out by five panelists to make an assessment as to the flavor of the spirits. As a result, it was found that the white oak finished product according to the present invention imparted a robust aroma resulting from lignin-derived phenol compounds to the spirits. In addition, it was also found that the white oak finished product had the effect of smoothly spreading the aroma, making the taste mild, and adding richness and a savory taste. It can be considered that these effects also greatly result from the change in the composition of the spirits due to the immersion of the finished product containing a product of the Maillard reaction, pyrazines, and organic acids in addition to the products of lignin decomposition.

Example 22

Manufacture of Spirits Using Barley Seed and Cherry Wood

Spirits was manufactured using a barley seed finished product according to the present invention as a raw material in the following manner. In place of using malt, barley seeds were subjected to high-temperature and high-pressure processing (200° C., 1.4 MPa) according to the method described in Example 1 to obtain a barley seed finished product, and spirits was manufactured using the barley seed finished product in an amount of 10% of all the raw materials used. Specifically, 5 kg of barley seeds subjected to high-temperature and high-pressure processing (200° C., 1.4 MPa) was mixed with 45 kg of malt, and they were mashed for about 1 hour with 200 L of water having a temperature of 65° C. The resulting mash was filtered, and then the filtrate was subjected to continuous distillation to obtain spirits. Then, in place of using malt husks, cherry wood was subjected to high-temperature and high-pressure processing (200° C., 1.4 MPa) according to the method described in Example 2, to obtain a cherry wood finished product, and the cherry wood finished product was cut into a cube (1 cm per side). The cherry wood finished product was immersed in the obtained spirits in such a manner that the amount of the cherry wood finished product became 0.1% with respect to the amount of the spirits. In this way, spirits was obtained.

Sensory evaluation was carried out by five panelists to make an assessment as to the flavor of the spirits. As a result, it was found that the barley seed finished product and the cherry wood finished product according to the present invention imparted a robust aroma resulting from lignin-derived phenol compounds to the spirits. In addition, it was also found that the barley seed finished product and the cherry wood finished product had the effect of smoothly spreading the aroma, making the taste mild, and adding richness and a savory taste. It can be considered that these effects also greatly result from the change in the composition of the spirits due to the use of the finished products containing a product of the Maillard reaction, pyrazines, and organic acids in addition to the products of lignin decomposition.

Example 23

Manufacture of Liqueur Using Malt

Liqueur was manufactured using a malt finished product according to the present invention as a raw material in the following manner. Malt was subjected to high-temperature and high-pressure processing (200° C., 1.4 MPa) according to the method described in Example 1 to obtain a malt finished product, which was then immersed in grain spirits in such a manner that the amount of the malt finished product became 5% with respect to the amount of the grain spirits. In this way, liqueur was obtained.

Sensory evaluation was carried out by five panelists to make an assessment as to the flavor of the liqueur. As a result, it was found that the malt finished product according to the present invention imparted a robust aroma resulting from lignin-derived phenol compounds to the liqueur. In addition, it was also found that the malt finished product had the effect of smoothly spreading the aroma, making the taste mild, and adding richness and a savory taste. It can be considered that these effects also greatly result from the change in the composition of the liqueur due to the use of the finished product containing a product of the Maillard reaction, pyrazines, and organic acids in addition to the products of liqnin decomposition.

Example 24

Manufacture of Liqueur Using Tea Leaves

Liqueur was manufactured using a tea leaf finished product according to the present invention as a raw material in the following manner. In place of using malt husks, tea leaves were subjected to high-temperature and high-pressure processing (200° C., 1.4 MPa) according to the method described in Example 2 to obtain a tea leaf finished product, which was then immersed in grain spirits in such a manner that the amount of the tea leaf finished product became 5% with respect to the amount of the grain spirits. In this way, liqueur was obtained.

Sensory evaluation was carried out by five panelists to make an assessment as to the flavor of the liqueur. As a result, it was found that the tea leaf finished product according to the present invention imparted a robust aroma resulting from lignin-derived phenol compounds to the liqueur. In addition, it was also found that the tea leaf finished product had the effect of smoothly spreading a robust aroma, making the taste mild, and adding richness and a savory taste. It can be considered that these effects also greatly result from the change in the composition of the liqueur due to the immersion of the finished product containing a product of the Maillard reaction, pyrazines, and organic acids in addition to the products of lipid decomposition.

Example 25

Manufacture of Tea Drink Using Tea Leaves

A tea drink was manufactured using a tea leaf finished product according to the present invention in the following manner. In place of using malt husks, fresh tea leaves were subjected to high-temperature and high-pressure processing (200° C., 1.4 MPa) according to the method described in Example 2. The resulting tea leaf finished product was immersed in hot water of 90° C. to obtain a tea drink.

Sensory evaluation was carried out by five panelists to make an assessment as to the flavor of the tea drink. As a result, it was found that the tea leaf finished product according to the present invention imparted a robust aroma resulting from lignin-derived phenol compounds to the tea drink. In addition, it was also found that the tea leaf finished product had the effect of smoothly spreading a sweet-sour aroma and a robust aroma, making the taste mild, and adding richness, a savory taste, and a moderately sour taste. It can be considered that these effects also greatly result from the change in the composition of the tea drink due to the use of the tea leaf finished product containing a product of the Maillard reaction, pyrazines, and organic acids in addition to the products of lignin decomposition.

Example 26

Manufacture of Tea Drink Using Barley Seeds

A tea drink was manufactured using a barley seed finished product according to the present invention as a raw material in the following manner. In place of using malt, barley seeds were subjected to high-temperature and high-pressure processing (200° C., 1.4 MPa) according to the method described in Example 1 to obtain a barley seed finished product. The barley seed finished product was added to tea leaves in such a manner that the amount of the barley seed finished product became 10% relative to the amount of the tea leaves used. The mixture of the tea leaves and the barley seed finished product was immersed in hot water of 90° C. to obtain a tea drink.

Sensory evaluation was carried out by five panelists to make an assessment as to the flavor of the tea drink. As a result, it was found that the barley seed finished product according to the present invention imparted a robust aroma resulting from lignin-derived phenol compounds to the tea drink. In addition, it was also found that the barley seed finished product had the effect of smoothly spreading a sweet-sour aroma and a robust aroma, making the taste mild, and adding richness, a savory taste, and a moderately sour taste. It can be considered that these effects also greatly result from the change in the composition of the tea drink due to the use of the finished product containing a product of the Maillard reaction, pyrazines, and organic acids in addition to the products of lignin decomposition.

Example 27

Manufacture of Tea Drink Using Malt, Rice Seed Husks, and Bamboo

A blended tea drink was manufactured using a malt finished product, a rice seed husk finished product, and a bamboo finished product according to the present invention in the following manner. In place of using malt husks, malt was subjected to high-temperature and high-pressure processing (200° C., 1.4 MPa) according to the method described in Example 1, and rice seed husks were subjected to high-temperature and high-pressure processing (200° C., 1.4 MPa) according to the method described in Example 2. The resulting malt finished product and rice seed husk finished product in place of using malt husks were added to tea leaves in such a manner that the amount of each of the finished products became 3% relative to the amount of the tea leaves used. Further, in place of using malt husks, bamboo was also subjected to high-temperature and high-pressure processing (200° C., 1.4 MPa) according to the method described in Example 2, and the resulting bamboo finished product was cut into a cube (about 1 cm per side). The bamboo finished product, and the tea leaves containing the malt finished product and the rice seed husk finished product were immersed in hot water of 90° C. to obtain a blended tea drink.

Sensory evaluation was carried out by five panelists to make an assessment as to the flavor of the tea drink. As a result, it was found that the malt finished product, the rice seed husk finished product, and the bamboo finished product according to the present invention imparted a robust aroma resulting from lignin-derived phenol compounds to the tea drink. In addition, it was also found that the malt finished product, the rice seed husk finished product, and the bamboo finished product had the effect of imparting not only a sweet and robust aroma but also an aroma of bamboo, making the taste mild, and adding richness and a savory taste. It can be considered that these effects also greatly result from the change in the composition of the tea drink due to the use of the finished products containing a product of the Maillard reaction, pyrazines, and organic acids in addition to the products of lipid decomposition.

INDUSTRIAL APPLICABILITY

The present invention can be applicable to the manufacture of a new plant finished product. More specifically, the present invention provides a method of manufacturing a plant finished product having a new flavor, and a method of manufacturing liquors by the use of the plant finished product as a raw material. According to the present invention, it is possible to manufacture a plant finished product while suppressing the oxidation of substances contained in a plant. Further, according to the present invention, it is also possible to manufacture a plant finished product while shortening the processing time of a plant and reducing input energy.

The invention claimed is:

1. A method of manufacturing a processed plant selected from the group consisting of processed malt, processed grain, processed tea leaf, processed tea stem, processed coffee bean, processed bean, and processed wood, which contains an increased amount of vanillin as compared to before the processing,
    comprising the step of processing a lignin-containing plant selected from the group consisting of malt, grain, tea leaf, tea stem, coffee bean, bean, and wood, or the processed material thereof as a raw material with a high-temperature and high-pressure gas comprising water vapor and having a temperature of about 140 to 250° C. and a pressure of about 0.25 to 4.5 MPa, under conditions where an oxygen concentration is about 0 to 1 μg/mL
    to increase the amount of vanillin contained in the lignin-containing plant or the processed material thereof.

2. The method according to claim 1, wherein the lignin-containing plant is selected from the group consisting of malt, grain, tea leaf, tea stem, coffee bean, bean, and wood, or the processed material thereof is processed for about 1 to 3,600 seconds.

3. The method according to claim 1, wherein the lignin-containing plant is selected from the group consisting of malt, grain, tea leaf, tea stem, coffee bean, bean, and wood, or the processed material thereof is processed for about 10 to 1,200 seconds with a gas having a temperature of about 160 to 250° C. and a pressure of about 0.5 to 4.5 MPa.

4. The method according to claim 1, wherein the gas is derived from deaerated liquid.

5. The method according to claim 1, wherein a gas having an oxygen concentration of about 0 to 1 μg/mL is used to purge a processing container before processing.

6. The method according to claim 5, wherein the gas having an oxygen concentration of about 0 to 1 μg/mL is an inert gas, carbon dioxide, or deoxidized gas.

7. The method according to claim 1, wherein the lignin-containing plant is selected from the group consisting of malt, grain, tea leaf, tea stem, coffee bean, bean, and wood, or the processed material thereof is at least one selected from grain, wood, tea leaf, and processed materials thereof.

8. The method according to claim 1, comprising the steps of processing malt for about 10 to 1200 seconds with a high-temperature and high-pressure gas having a temperature of about 140° C. to 250° C. and a pressure of about 0.25 to 4.5 MPa under conditions where an oxygen concentration is about 0 to 1 μg/mL in a hermetically-sealed container and taking out the resultant solid product from the container, wherein the processed malt comprises an increased amount of vanillin as compared to the malt.

9. The method according to claim 1, wherein the lignin-containing plant is selected from the group consisting of malt, grain, tea leaf, tea stem, coffee bean, bean, and wood, or the processed material thereof is processed with the gas having a temperature of about 160 to 250° C. and a pressure of about 0.25 to 4.5 MPa.

10. The method according to claim 1, wherein the gas is water vapor.

11. The method according to claim 1, wherein the step of processing with high-temperature and high-pressure gas is carried out in a hermetically-sealed container, and wherein the method further comprises the step of taking out the resulting solid product from the container.

12. The method according to claim 1, wherein the lignin-containing plant is selected from the group consisting of malt, grain, tea leaf, tea stem, coffee bean, bean, and wood, or the processed material thereof is at least one selected from grain, coffee bean, and processed materials thereof.

13. The method according to claim 8, further comprising the step of pulverizing the resultant solid product.

14. A method for increasing vanillin contained in a plant selected from the group consisting of malt, grain, tea leaf, tea stem, coffee bean, bean, and wood, or processed material thereof, comprising processing the lignin-containing plant selected from the group consisting of malt, grain, tea leaf, tea stem, coffee bean, bean, and wood, or a processed material thereof with high-temperature and high-pressure gas comprising water vapor and having a temperature of about 140 to 250° C. and a pressure of about 0.25 to 4.5 MPa, under conditions where an oxygen concentration is about 0 to 1 μg/mL.

15. A method of manufacturing a processed plant selected from the group consisting of processed malt, processed malt husk, processed rice seed, processed white oak, processed bamboo, processed straw, processed barley, and processed cherry wood, which contains an increased amount of vanillin as compared to before the processing,
    comprising the step of processing a lignin-containing plant selected from the group consisting of malt, malt husk, rice seed, white oak, bamboo, straw, barley, and cherry wood, or a processed material thereof for about 10 to 1,200 seconds with high-temperature and high-pressure gas comprising water vapor and having a temperature of about 140 to 250° C. and a pressure of about 0.25 to 4.5 MPa under conditions where an oxygen concentration is about 0 to 1 μg/mL to produce the processed.

* * * * *

UNITED STATES PATENT AND TRADEMARK OFFICE
CERTIFICATE OF CORRECTION

| | | |
|---|---|---|
| PATENT NO. | : 8,603,567 B2 | Page 1 of 1 |
| APPLICATION NO. | : 10/530679 | |
| DATED | : December 10, 2013 | |
| INVENTOR(S) | : Kageyama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this
Twenty-fourth Day of November, 2015

Michelle K. Lee
*Director of the United States Patent and Trademark Office*